(12) United States Patent
Edge

(10) Patent No.: US 8,031,938 B2
(45) Date of Patent: Oct. 4, 2011

(54) METHOD AND APPARATUS FOR PROVIDING IMPROVED HUMAN OBSERVER XYZ FUNCTIONS AND CALCULATIONS FOR CIELAB

(75) Inventor: Christopher J. Edge, St. Paul, MN (US)

(73) Assignee: Eastman Kodak Company, Rochester, NJ (US)

( * ) Notice: Subject to any disclaimer, the term of this patent is extended or adjusted under 35 U.S.C. 154(b) by 799 days.

(21) Appl. No.: 12/102,238

(22) Filed: Apr. 14, 2008

(65) Prior Publication Data

US 2009/0257648 A1    Oct. 15, 2009

(51) Int. Cl.
*G06K 9/00*    (2006.01)
(52) U.S. Cl. .......................... 382/167; 382/162
(58) Field of Classification Search .................. 382/162, 382/165, 167, 115, 128, 154; 358/520, 522; 348/504, 518; 345/589; 340/5.53; 356/406, 356/402; 250/578.1
See application file for complete search history.

(56) References Cited

U.S. PATENT DOCUMENTS 5,739,928 A * 4/1998 Scott ............................ 358/520

OTHER PUBLICATIONS

F. Perez-Ocon et al., "Contribution to the Experimental Review of the Colorimetric Standard Observer", Col. Res. Appl., vol. 24, No. 5, Oct. 1999, pp. 377-388, XP-002535433.
W.S. Stiles and J.M. Burch; N.P.L. colour-matching investigation: Final Report (1958), National Physical Laboratory; pp. 1-26.
Robert Hunt; The Reproduction of Colour; pp. 138-141 and pp. 706-707.
W.S. Stiles and J.M. Burch; Interim Report to the Commission Internationale de l'Eclairage, Zurich, 1955, on the National Physical Laboratory's investigation of colour-matching (1955); pp. 168-181.
Nobuhito Matsushiro et al.; Optimizing Color-Matching Functions for Individual Observers Using a Variation Method; Journal of Imaging Science and Technology, vol. 45, No. 5, Sep./Oct. 2001, pp. 472-480.
Mark D. Fairchild; A Novel Method for the Determination of Color Matching Functions; COLOR research and application, 1989, pp. 122-130.
Amy D. North and Mark D. Fairchild; Measuring Color-Matching Functions. Part I; vol. 18, No. 3, Jun. 1993, pp. 155-162.
Amy D. North and Mark D. Fairchild; Measuring Color-Matching Functions. Part II. New Data for Assessing Observer Metamerism; vol. 18, No. 3, Jun. 2003, pp. 163-170.
William A. Thornton; Toward a More Accurate and Extensible Colorimetry. Part VI. Improved Weighting Functions. Preliminary Results; COLOR research and application, pp. 226-233.
Mark Shaw and Mark Fairchild; Evaluating the 1931 CIE Color Matching Functions.
Alvin Data, Rochester Institute of Technology (RIT).
Thornton Data, Rochester Institute of Technology (RIT).
Mark D. Fairchild; Color Appearance Models, Chapter 9, pp. 199-221.

* cited by examiner

*Primary Examiner* — Anh Hong Do
(74) *Attorney, Agent, or Firm* — Nelson Adrian Blish

(57) ABSTRACT

A method for determining color-matching functions includes obtaining spectral data originating from metameric pairs and generating new color matching functions by modifying original color matching functions. The new color matching functions are constrained to be similar to the original color matching functions while reducing calculated perceptual error between the metameric pairs. In another embodiment a method for determining color-matching functions spectral data originating from color matching experiments and from metameric pairs are generated. Color matching functions from a set of parameters and an error function that indicates error due to perceptual differences between the parameterized color matching functions and the color matching experiments are defined. Methods for defining human observer functions, optimizing the definitions of LMS cone response functions as well as other methods and systems are also disclosed.

4 Claims, 9 Drawing Sheets

METHOD AND APPARATUS FOR PROVIDING IMPROVED HUMAN OBSERVER XYZ FUNCTIONS AND CALCULATIONS FOR CIELAB

FIELD OF THE INVENTION

This invention relates in general to the field of color measurement and in particular to a method and apparatus for optimizing the LMS cone responses which can be used as the basis for the XYZ human observer functions in order to better predict metameric matches using published color matching functions in conjunction with sets of spectral data comprising of metameric pairs.

BACKGROUND OF THE INVENTION

The human experience of color is dependent on the spectral properties of the stimulant, i.e. the color being observed, combined with the spectral sensitivities of the eye+brain system. This in turn is governed by the spectral sensitivities of the LMS (long, medium, short wavelength) cones residing in the retina and the neural and cognitive processing of the LMS responses performed by the retina and brain. Thus, whereas measuring the spectra of a color stimulant is objective and unambiguous, measuring the human sensation known as color is dependent on the validity of what are referred to as the human observer functions CIEXYZ (which define color matching and can be related to LMS) and the calculation for CIELAB (which is dependent on XYZ and defines how colors are perceived).

Since CIEXYZ and CIELAB are derived from experiments involving human observers, the validity of CIEXYZ and CIELAB may be compromised by errors in the experimental data acquired (in the case of color matching experiments), errors in the methods used to convert the raw data to human observer functions, and errors in color order systems such as Munsell which were used to optimize the calculation for CIELAB.

The imperfections in CIEXYZ and CIELAB are well-known in the industry:
a) Colors that measure the same values of CIEXYZ and CIELAB do not necessarily match, especially whites comprised of significantly different spectra.
b) Colors that differ by the same Euclidean distance in CIELAB may appear nearly identical or may appear dramatically different depending on the location of the colors within the CIELAB coordinate system and the direction of their color difference.

If the current methods for calculating CIEXYZ and CIELAB were valid, colors with significantly different spectra but similar values of CIEXYZ and CIELAB would match visually. Such pairs of colors are called "metameric pairs" or "metamers". To the extant that such pairs of colors do not match visually, one can say that CIEXYZ and CIELAB are imperfect methods for defining or measuring color. This results in pairs of colors that are metameric matches numerically but not visually.

In order to identify possible sources of error in the definitions of CIEXYZ and CIELAB, we begin with a very brief history of modern day colorimetry. The Commission Internationale de l'Éclairage (hereinafter "CIE") XYZ observer functions are the basis for most color measurements that require the matching of colors. By combining these functions with non-linear color appearance models (CAMs) such as CIELAB and CIECAM96s CAMs, complex color images as well as simple color patches can be reproduced with great success if the color media are similar in spectral behavior.

The color matching functions of the CIE 1931 standard were based on the data of Guild using seven observers and Wright using ten observers together with the CIE 1924 luminous efficiency function V (λ). As a result of visual vs. numerical discrepancies in the matching of paper white, Stiles performed a "pilot" repeat of the 1931 determination of the color matching functions using 10 observers and (together with Burch) a "final" version using 49 observers in 1958. This latter "final" experiment was performed using a larger field of view (10 degree rather than 2 degree) and hence the two standards from 1931 and 1958 are referred to as the 2 and 10-degree observer, respectively. Example plots of the raw color matching data acquired from the multiple observers by Stiles and Burch, *N.P.L. colour-matching investigation: Final Report* (1958), *National Physical Laboratory*, pp. 1-26, clearly indicate significant noise and variability in the data, probably due to the procedures used to obtain the color matches and the imperfect skill of the participants in the art of adjusting colors for purposes of obtaining a match.

In his book "The Reproduction of Colour" pp. 138-141 and pp. 706-707, Robert Hunt relates the historical XYZ observer functions to the spectral sensitivities of the LMS cones in the retina. Hunt cites Estevez and similar references regarding the red, green, blue spectral sensitivities of the cones (p. 706). By comparing these estimates with the existing XYZ observer functions, Hunt defines the Hunt-Estevez-Pointer conversion that converts the XYZ observer functions to the long-medium-short spectral sensitivities of the eye LMS (as defined in most references) or equivalently $\rho$, $\beta$, $\gamma$ (the labels Hunt prefers to avoid confusion with other color values such as using "L" for luminance). The Hunt-Estevez-Pointer matrix is defined as:

$$M_{XYZ \to LMS} = \begin{pmatrix} 0.38971 & 0.68898 & -0.07868 \\ -0.22981 & 1.18340 & 0.04641 \\ 0 & 0 & 1.00 \end{pmatrix} \quad \text{Eq. (1-1)}$$

While the CIEXYZ observer functions appear to work well between media that are somewhat similar using similar lighting conditions, there appears to be a discrepancy between measurement and visual matches for media with radically different spectra, particularly in the areas of whites. This discrepancy has been documented as the impetus for the 10 degree (vs. 2 degree) observer function effort performed by Stiles and Burch from 1955-1958 (*Interim Report to the Commission of Internationale de l'Eclariage, Zurich*, 1955, *on the National Physical Laboratory's investigation of colour-matching* (1955), pp. 168-181; *and N.P.L. colour-matching investigation: Final Report* (1958), *National Physical Laboratory*, pp. 1-26) and is the basis for the deviation from standard CIE XYZ metrology developed in conjunction with MATCHPRINT™ Virtual technology from Eastman Kodak, which is used in a variety of systems that require an accurate visual color match between displays and printed images viewed under standard illumination.

The methods used to improve the CIE functions fall into two categories. The first category are methods such as those used by Thornton (1998) and also by Matsushiro, Ohta, Shaw, and Fairchild (*Optimizing Color-Matching Functions for Individual Observers Using a Variation Method, Journal of Imaging Science and Technology*, Vol. 45, No. 5, September/October 2001, pp. 472-480) which attempt to alter the human observer functions on a wavelength by wavelength basis, possibly with constraints, in order to minimize error between metameric pairs as well as to remain similar to the original human observer functions. This effectively allows the number of adjustable parameters to be 3×32=96 or higher.

The second category of approach is to use a small number of parameters as discussed in Fairchild (*A Novel Method for the Determination of Color Matching Functions*, COLOR research and application, 1989, pp. 122-130) and North and Fairchild (*Measuring Color-Matching Functions*. Part I, Vol. 18, No. 3, June, 1993 op. 155-162; and *Measuring Color-Matching Functions, Part II, New Data for Assessing Observer Metamerism*, Vol. 18, No. 3, June, 1993, pp. 163-170) relying for example on the "deviant observer" which attempts to account for yellowing effects of aging due to the lens and the macula by applying broad band absorption spectra to the LMS functions. This approach has the deficiency of being very limited in how it modifies the standard human observer functions. So although this approach can accurately mimic the standard human observer functions, it cannot adequately modify the functions in order to reduce the calculated ΔE errors between metameric pairs that have significantly different spectra and yet match visually.

DETAILED DESCRIPTION OF THE INVENTION

Figure 1:
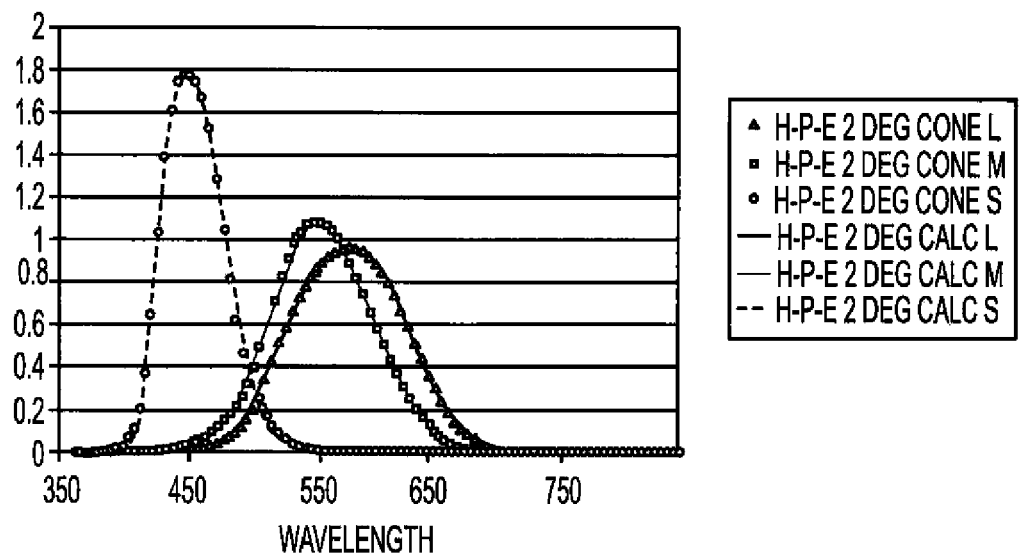
FIG. 1 shows a plot for LMS in accordance with one embodiment of the invention.

Experiments involving metameric pairs can be used to assess the validity of existing methods for calculating CIEXYZ and CIELAB. The results of such experiments can be used by this invention to improve CIEXYZ. Likewise, comparing the relative differences of colors defined in a color order system such as Munsell can assess the validity of both CIEXYZ and CIELAB with regard to perceptual uniformity of these numerical definitions of color. The results of such comparisons can be used to improve CIEXYZ and CIELAB.

However, in the event that the color order system itself is flawed or misinterpreted regarding its use in validating CIEXYZ and CIELAB, independent tests can be devised to confirm whether the color order system itself is adequate for optimizing the calculation used for defining color measurement. These independent tests can comprise of very simple test images that display steps of color that change in a progression by a consistent increment as calculated by CIELAB, both in different regions of color, and in various directions of color. In the event that the color order system is inadequate for purposes of optimizing CIELAB, the test images will displays progressions of color change that are dramatic in some color directions and in certain regions of color, and are barely noticeable in other color directions and/or regions of colors.

By visually editing and optimizing such test images such that these progressions are visually consistent, one can optimize CIEXYZ and CIELAB by means of the measured data from these charts, treating the data set as a subset of a new color order system. Since embodiments of the invention is based upon a new understanding of the physics of human color vision, it is possible to optimize CIEXYZ and CIELAB in an effective manner that results in a successful validation test using the abovementioned charts, and which will be valid even for a color order system comprising of many samples. In fact, a new color order system can now be defined that is based solely on equal increments in this improved CIEXYZ and CIELAB space, which we will be refer hereinafter as "EdgeXYZ" and "EdgeLAB".

In the following description a method and apparatus are described for optimizing the LMS cone responses which can be used as the basis for the XYZ human observer functions using published color matching functions in conjunction with sets of spectral data comprising of metameric pairs. The method and apparatus are further described regarding the optimization of the conversion of LMS to XYZ and the coefficients used to calculate CIELAB using data from color order systems and from validation charts for testing perceptual uniformity of CIELAB. One objective of the invention is to use far fewer parameters than the first category previously described which attempt to alter the human observer functions on a wavelength-by-wavelength basis, possibly with constraints, but yet still be able to lower the calculated ΔE errors between metameric pairs by a fairly large amount (e.g., at least 50%).

The description begins by constructing a framework within which we can clarify the mathematics of color matching experiments, such as was performed by Guild and Wright.

The following notation is used: the $\vec{\lambda}_T$ vector refers to the choice of tristimulous wavelengths used to match a color of wavelength λ. The components of the vector $\overrightarrow{RGB}(\lambda, \vec{\lambda}_T)$ are the magnitudes of the tristimulous wavelengths required to match the color of wavelength λ. Note that negative values of any of the three components of $\overrightarrow{RGB}(\lambda, \vec{\lambda}_T)$ denote adding a quantity of light given by the magnitude of that component (the wavelength of the light being the same as that of the component) to the color of wavelength λ that is being matched.

These components are by definition the CMFs for the particular tristimulous wavelengths $\vec{\lambda}_T$. In a similar manner, vector functions for XYZ and LMS are defined that are calculated from the Dirac delta function that are used to characterize the spectra power distribution (SPD) of a monochromatic light source of wavelength λ, together with the human observer functions $\bar{x}(\lambda), \bar{y}(\lambda), \bar{z}(\lambda)$:

$$\vec{\lambda}_T = \begin{pmatrix} \lambda_r \\ \lambda_g \\ \lambda_b \end{pmatrix} \quad \text{Eq. (1-2)}$$

$$\overrightarrow{RGB}(\lambda, \vec{\lambda}_T) = \begin{pmatrix} R(\lambda, \vec{\lambda}_T) \\ G(\lambda, \vec{\lambda}_T) \\ B(\lambda, \vec{\lambda}_T) \end{pmatrix}$$

$$\overrightarrow{XYZ}(\lambda) = \begin{pmatrix} X(\lambda) \\ Y(\lambda) \\ Z(\lambda) \end{pmatrix}$$

$$\overrightarrow{LMS}(\lambda) = \begin{pmatrix} L(\lambda) \\ M(\lambda) \\ S(\lambda) \end{pmatrix}$$

$$S_\lambda(\lambda') = \delta(\lambda' - \lambda) \quad \text{Eq. (1-3)}$$

$$\overrightarrow{XYZ}(\lambda) = \begin{pmatrix} \int S_\lambda(\lambda')\bar{x}(\lambda')d\lambda' \\ \int S_\lambda(\lambda')\bar{y}(\lambda')d\lambda' \\ \int S_\lambda(\lambda')\bar{z}(\lambda')d\lambda' \end{pmatrix} = \begin{pmatrix} \bar{x}(\lambda) \\ \bar{y}(\lambda) \\ \bar{z}(\lambda) \end{pmatrix} = \overrightarrow{xyz}(\lambda)$$

$$\overrightarrow{LMS}(\lambda) = \begin{pmatrix} \int S_\lambda(\lambda')\bar{l}(\lambda')d\lambda' \\ \int S_\lambda(\lambda')\bar{l}(\lambda')d\lambda' \\ \int S_\lambda(\lambda')\bar{s}(\lambda')d\lambda' \end{pmatrix} = \begin{pmatrix} \bar{l}(\lambda) \\ \bar{m}(\lambda) \\ \bar{s}(\lambda) \end{pmatrix} = \overrightarrow{lms}(\lambda)$$

When it is determined that a given set of R,G,B magnitudes of tristimulous colors $\vec{\lambda}_T$ match a reference color of wavelength λ, the values of XYZ for the matching colors must be equal, which implies the following:

$$\overrightarrow{XYZ}(\lambda) = R(\lambda, \vec{\lambda}_T)\overrightarrow{XYZ}(\lambda_r) + \quad \text{Eq. (1-4)}$$

$$G(\lambda, \vec{\lambda}_T)\overrightarrow{XYZ}(\lambda_g) + B(\lambda, \vec{\lambda}_T)\overrightarrow{XYZ}(\lambda_b)$$

$$= R(\lambda, \vec{\lambda}_T)\begin{pmatrix} \bar{x}(\lambda_r) \\ \bar{y}(\lambda_r) \\ \bar{z}(\lambda_r) \end{pmatrix} +$$

$$G(\lambda, \vec{\lambda}_T)\begin{pmatrix} \bar{x}(\lambda_g) \\ \bar{y}(\lambda_g) \\ \bar{z}(\lambda_g) \end{pmatrix} + B(\lambda, \vec{\lambda}_T)\begin{pmatrix} \bar{x}(\lambda_b) \\ \bar{y}(\lambda_b) \\ \bar{z}(\lambda_b) \end{pmatrix}$$

$$= M_{\overline{xyz}}(\vec{\lambda}_T)\overrightarrow{RGB}(\lambda, \vec{\lambda}_T)$$

$$= \begin{pmatrix} \bar{x}(\lambda) \\ \bar{y}(\lambda) \\ \bar{z}(\lambda) \end{pmatrix} \text{ where}$$

$$M_{\overline{xyz}}(\vec{\lambda}_T) = \begin{pmatrix} \bar{x}(\lambda_r) & \bar{x}(\lambda_g) & \bar{x}(\lambda_b) \\ \bar{y}(\lambda_r) & \bar{y}(\lambda_g) & \bar{y}(\lambda_b) \\ \bar{z}(\lambda_r) & \bar{z}(\lambda_g) & \bar{z}(\lambda_b) \end{pmatrix} \quad \text{Eq. (1-5)}$$

This implies that the predicted CMFs are given by:

$$\overrightarrow{RGB}(\lambda, \vec{\lambda}_T) = (M_{\overline{xyz}}(\vec{\lambda}_T))^{-1}\overrightarrow{XYZ}(\lambda) \quad \text{Eq. (1-6)}$$

$$= (M_{\overline{xyz}}(\vec{\lambda}_T))^{-1}\overrightarrow{xyz}(\lambda)$$

Thus, there is a well-defined relationship between a given choice of $\bar{x}(\lambda), \bar{y}(\lambda), \bar{z}(\lambda)$ observer functions (for example 2 degree and 10 degree) and the CMFs that should be observed for a given set of tristimulous wavelengths $\vec{\lambda}_T$.

The above relationship implies that all CMFs are linear transforms of one another:

$$\overrightarrow{RGB}(\lambda, \vec{\lambda}_{T_1}) = M_{\overline{xyz}}^{-1}(\vec{\lambda}_{T_1})\overrightarrow{xyz}(\lambda) \quad \text{Eq. (1-7)}$$

$$= M_{\overline{xyz}}^{-1}(\vec{\lambda}_{T_1})M_{\overline{xyz}}(\vec{\lambda}_{T_2})M_{\overline{xyz}}^{-1}(\vec{\lambda}_{T_2})\overrightarrow{xyz}(\lambda)$$

$$= M_{\overline{xyz}}^{-1}(\vec{\lambda}_{T_1})M_{\overline{xyz}}(\vec{\lambda}_{T_2})\overrightarrow{RGB}(\lambda, \vec{\lambda}_{T_2})$$

This also implies that color matching is dependent only on the LMS sensitivities of the eye and is independent on the conversion matrix from CMFs to XYZ or LMS to XYZ:

$$\overrightarrow{RGB}(\lambda, \vec{\lambda}_T) = (M_{\overline{xyz}}(\vec{\lambda}_T))^{-1}\overrightarrow{xyz}(\lambda) \quad \text{Eq. (1-8)}$$

$$= (M_{\overline{xyz}}(\vec{\lambda}_T))^{-1}M_{XYZ \to LMS}^{-1}\overrightarrow{lms}(\lambda)$$

$$= (M_{\overline{XYZ \to LMS}}^{-1}M_{\overline{lms}}(\vec{\lambda}_T))^{-1}M_{XYZ \to LMS}^{-1}\overrightarrow{lms}(\lambda)$$

$$= (M_{\overline{lms}}(\vec{\lambda}_T))^{-1}(M_{XYZ \to LMS}^{-1})^{-1}$$

$$M_{XYZ \to LMS}^{-1}\overrightarrow{lms}(\lambda)$$

$$= (M_{\overline{lms}}(\vec{\lambda}_T))^{-1}M_{XYZ \to LMS}M_{XYZ \to LMS}^{-1}\overrightarrow{lms}(\lambda)$$

$$= (M_{\overline{lms}}(\vec{\lambda}_T))^{-1}\overrightarrow{lms}(\lambda)$$

where $$\overrightarrow{xyz}(\lambda_r) = M_{XYZ \to LMS}^{-1}\overrightarrow{lms}(\lambda_r) \quad \text{Eq. (1-9)}$$

$$\overrightarrow{xyz}(\lambda_g) = M_{XYZ \to LMS}^{-1}\overrightarrow{lms}(\lambda_g)$$

$$\overrightarrow{xyz}(\lambda_b) = M_{XYZ \to LMS}^{-1}\overrightarrow{lms}(\lambda_b)$$

implies that $$M_{\overline{xyz}}(\vec{\lambda}_T) = M_{XYZ \to LMS}^{-1}\begin{pmatrix} \bar{l}(\lambda_r) & \bar{l}(\lambda_g) & \bar{l}(\lambda_b) \\ \bar{m}(\lambda_r) & \bar{m}(\lambda_g) & \bar{m}(\lambda_b) \\ \bar{s}(\lambda_r) & \bar{s}(\lambda_g) & \bar{s}(\lambda_b) \end{pmatrix} \quad \text{Eq. (1-10)}$$

$$= M_{XYZ \to LMS}^{-1}M_{\overline{lms}}(\vec{\lambda}_T)$$

Since some reasonable estimates for the LMS sensitivities as a function of wavelength are available, these functions can be characterized and refined in a manner so as to obtain the best fit between prediction and result for any existing CMF data sets. It can also be compared how well any particular XYZ or LMS characterization fits the data using various tristimulous $\vec{\lambda}_T$ can also be performed.

The entire mathematical framework in Equations (1-1)-(1-10) above can be calculated by using the red, green, blue spectra of the CRT in lieu of the three Dirac delta functions for the monochromatic tristimulous wavelengths $\vec{\lambda}_T$. One can easily show that Equation 1-1 through 1-10 above now becomes:

$$\vec{RGB}(\lambda, \vec{S}_T(\lambda')) = (M_{LMS}(\vec{S}_T(\lambda')))^{-1} \vec{lms}(\lambda) \quad \text{Eq. (1-11)}$$

where $$\vec{S}_T(\lambda') = \begin{pmatrix} S_r(\lambda') \\ S_g(\lambda') \\ S_b(\lambda') \end{pmatrix}$$

$$M_{LMS}(\vec{S}_T(\lambda')) = \begin{pmatrix} L(S_r(\lambda')) & L(S_g(\lambda')) & L(S_b(\lambda')) \\ M(S_r(\lambda')) & M(S_g(\lambda')) & M(S_b(\lambda')) \\ S(S_r(\lambda')) & S(S_r(\lambda')) & S(S_r(\lambda')) \end{pmatrix} \quad \text{Eq. (1-12)}$$

$$\vec{LMS}(S_r(\lambda')) = \int S_r(\lambda') \vec{lms}(\lambda') d\lambda' \quad \text{Eq. (1-13)}$$

$$\vec{LMS}(S_g(\lambda')) = \int S_g(\lambda') \vec{lms}(\lambda') d\lambda'$$

$$\vec{LMS}(S_b(\lambda')) = \int S_b(\lambda') \vec{lms}(\lambda') d\lambda'$$

Method for Improving LMS and XYZ with Existing Data

Having confirmed that LMS is all that is required to determine whether colors match, next it is considered whether the LMS functions can be parameterized. If this is the case, one should be able to update the LMS functions in a progressive manner using data from 1931, 1955, and from today as illustrative examples. One should be able to combine data from these experiments with color matching data involving complex spectra.

The most common experiments performed other than the color matching experiments described above are experiments that determine pairs of visual metamers. This typically involves having a fixed reference color using one medium, and comparative colors created using a different medium that can easily be adjusted or modified in order to determine a visual match, i.e. define a pair of visual metamers.

For example, if the spectra for an Apple Cinema display, an Eizo™ GC210 display, and a GTI D50 viewer have been determined to match visually by adjusting the displays to match colors such as white paper in the GTI viewer, the spectra of the white shown on the display and the white of the paper in the viewer can be measured and converted to CIEXYZ and CIELAB. To the extant that the values of CIEXYZ and CIELAB are different, one can assume inaccuracies in the human observer functions. Previous attempts to improve CIEXYZ and CIELAB to correct these differences have not been successful. The present invention will address the issue via adjustments to the LMS cone responses and therefore to the XYZ functions derived from them while remaining consistent with data from the historical CMF experiments.

It is worthwhile to note that the differences observed between the 2 and 10 degree observer are of similar magnitude to the variability in data seems to indicate that there is still uncertainty in the definitions of XYZ which a global optimization of LMS parameters could help to improve.

Studying the plots for LMS, it seems clear that to a first order they can be considered asymmetrical Gaussians, which would be typical behavior of a quantum transition that is Doppler-broadened by rotational and vibrational energy levels. The following very simplified model can be to describe the LMS functions:

$$f_{lms}(\lambda, \alpha_i, \lambda_i, \Delta\lambda_{i1}, \Delta\lambda_{i2}, \gamma_{i1}, \gamma_{i2}, \delta_{i1}, \delta_{i2}, \Delta\gamma_{i1}, \Delta\gamma_{i2}) \quad \text{Eq. (2-1)}$$

$$= \alpha_i \left( \delta_{i1} + (1-\delta_{i1}) e^{-(|\lambda-\lambda_i|/2\Delta\lambda_{i1})^{(\gamma_{i1}+\Delta\gamma_{i1}|\lambda-\lambda_i|)}} \right) \text{ for } \lambda < \lambda_i$$

$$= \alpha_i (\delta_{i2} + (1-\delta_{i2}) e^{-(|\lambda-\lambda_i|/2\Delta\lambda_{i2})^{(\gamma_{i2}+\Delta\gamma_{i2}|\lambda-\lambda_i|)}} \text{ for } \lambda > \lambda_i$$

where i=0,1,2 for red (L), green (M), and blue (S). The parameter $\lambda_i$ defines the wavelength of maximum sensitivity for the L, M, or S function. $\Delta\lambda_{1i}$ defines the width of the quasi-Gaussian on the side where $\lambda<\lambda_i$, $\Delta\lambda_{2i}$ defines the width of the quasi-Gaussian for $\lambda>\lambda_i$. The exponents $\gamma_{1i}$ and $\gamma_{2i}$ (which are nominally of value 2 for a Gaussian distribution) in a similar fashion define the steepness of the curve shape for a given Gaussian-like width for $\lambda<\lambda_i$ and $\lambda>\lambda_i$. The scaling parameter $\alpha_i$, defines the relative height of the sensitivity for LMS. Since equal energy spectra appear white to the human eye, it is generally assumed that the integral of L, M, and S are equal in value, which can be ensured by setting the appropriate value of $\alpha_i$ for each.

The values of $\delta_{i1}$ and $\delta_{i2}$ (which are nominally 0) allow control over the minimum value of the LMS functions—this is important since very small values of LMS can have a big impact on CIELAB due to the cube root functions that define it. Finally, the correction parameters $\Delta\gamma_{i1}$ and $\Delta\gamma_{i2}$ (which are also nominally 0) allow a gradual increase or decrease in the power law of the exponent to optimize the correlation between the parameterized LMS and XYZ vs. the officially accepted values of LMS and XYZ. Like the other parameters, they correspond to $\lambda<\lambda_i$ and $\lambda>\lambda_i$ respectively.

Since the focus has been on color matching between combinations of narrow band spectra of wavelength $\lambda$, the tristimulous values XYZ have been loosely characterized as functions of wavelength $\lambda$. The tristimulous values XYZ will be distinguished from the human observer functions $\bar{x}(\lambda), \bar{y}(\lambda), \bar{z}(\lambda)$. The former is the integrated product of a spectral stimulant characterized by spectrum $S(\lambda)$ and the corresponding observer function $\bar{x}(\lambda), \bar{y}(\lambda), \bar{z}(\lambda)$. Similarly the tristimulous cone response values LMS are distinguished from the cone response functions of the human eye $\bar{l}(\lambda), \bar{m}(\lambda), \bar{s}(\lambda)$:

$$X = \int S(\lambda) \bar{x}(\lambda) d\lambda$$

$$Y = \int S(\lambda) \bar{y}(\lambda) d\lambda$$

$$Z = \int S(\lambda) \bar{z}(\lambda) d\lambda$$

$$L = \int S(\lambda) \bar{l}(\lambda) d\lambda$$

$$M = \int S(\lambda) \bar{m}(\lambda) d\lambda$$

$$S = \int S(\lambda) \bar{s}(\lambda) d\lambda \quad \text{Eq. (2-2)}$$

Thus, a parameterized $\bar{x}(\lambda), \bar{y}(\lambda), \bar{z}(\lambda)$ can be created from a parameterized $\bar{l}(\lambda), \bar{m}(\lambda), \bar{s}(\lambda)$ as follows in Eq. 2-3 below:

$$\vec{XYZ}(\lambda) = M_{LMS \to XYZ} \vec{LMS}(\lambda) \quad (2\text{-}3)$$

$$\vec{xyz}(\lambda) = \begin{pmatrix} \bar{x}(\lambda) \\ \bar{y}(\lambda) \\ \bar{z}(\lambda) \end{pmatrix} = M_{LMS \to XYZ} \vec{lms}(\lambda) = M_{LMS \to XYZ} \begin{pmatrix} \bar{l}(\lambda) \\ \bar{m}(\lambda) \\ \bar{s}(\lambda) \end{pmatrix}$$

$$\vec{xyz}_E(\lambda) =$$

-continued $$M_{LMS \rightarrow XYZ} \begin{pmatrix} f_{lms}(\lambda, \alpha_l, \lambda_l, \Delta\lambda_{l1}, \Delta\lambda_{l2}, \gamma_{l1}, \gamma_{l2}, \delta_{l1}, \delta_{l2}, \Delta\gamma_{l1}, \Delta\gamma_{l2}) \\ f_{lms}(\lambda, \alpha_m, \lambda_m, \Delta\lambda_{m1}, \Delta\lambda_{m2}, \gamma_{m1}, \gamma_{m2}, \delta_{m1}, \delta_{m2}, \Delta\gamma_{m1}, \Delta\gamma_{m2}) \\ f_{lms}(\lambda, \alpha_s, \lambda_s, \Delta\lambda_{s1}, \Delta\lambda_{s2}, \gamma_{s1}, \gamma_{s2}, \delta_{s1}, \delta_{s2}, \Delta\gamma_{s1}, \Delta\gamma_{s2}) \end{pmatrix}$$

where $$M_{LMS \rightarrow XYZ} = M_{XYZ \rightarrow LMS}^{-1} \quad \text{(Eq. 2-3a)}$$

The $\vec{xyz}_E$ is used to denote the "EdgeXYZ" human observer functions $\bar{x}(\lambda), \bar{y}(\lambda), \bar{z}(\lambda)$ in accordance with one embodiment of the invention and $\overrightarrow{XYZ}_E$ is used to denote the integrated tristimulous values XYZ calculated from the color stimulus and $\vec{xyz}_E$. In the equation above, the dependence of $\vec{xyz}_E$ on the EdgeXYZ parameters is implicit. In later expressions it will be explicitly indicated that $\vec{xyz}_E$ is a function of the EdgeXYZ parameters.

The following values in Table 1 were determined via manual adjustment of the above parameters, using nominal values of 0.0 for δ's and Δγ's:

TABLE 1

| | Value (based on 2 degree CMFs of G&W) | | |
|---|---|---|---|
| | L | M | S |
| Lambda0 | 577 | 547 | 449 |
| MaxTristim | 0.95 | 1.1 | 1.77 |
| Width1 | 32.6 | 24.0 | 16.0 |
| Width2 | 29.3 | 30.0 | 18.4 |
| Exp1 | 2.6 | 1.7 | 2.8 |
| Exp2 | 2.25 | 1.94 | 1.8 |

Figure 2:
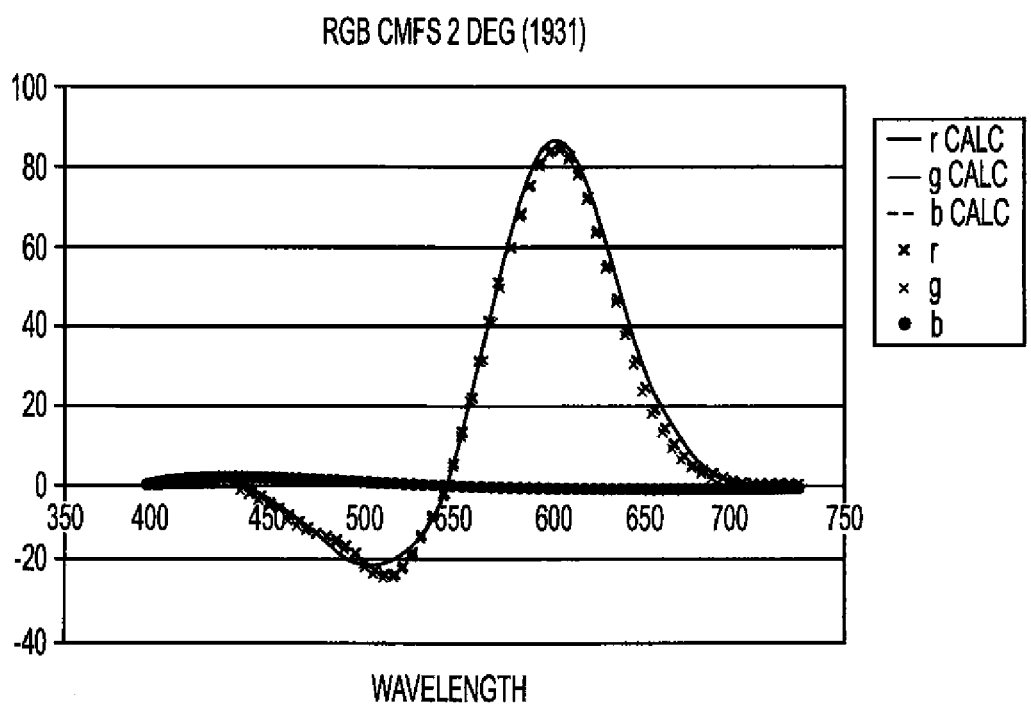
FIG. 2 shows a graph highlighting color-matching function predicted versus data at full scale for R in accordance with an embodiment of the invention.
Figure 3:
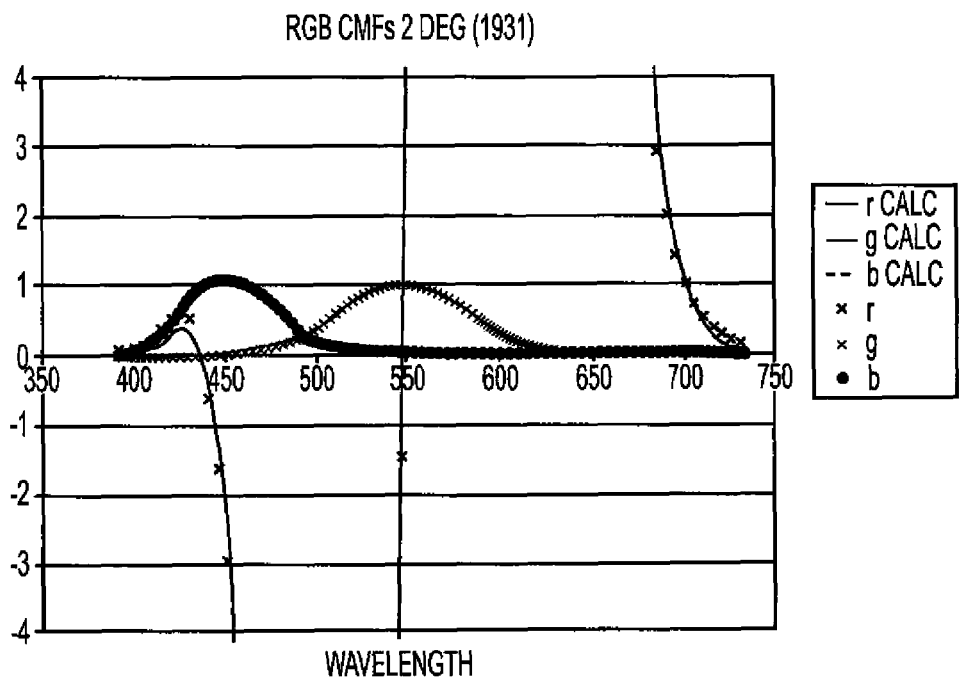
FIG. 3 shows a graph highlighting color-matching function predicted versus data magnified ×25 for G and B in accordance with an embodiment of the invention.
Figure 4:
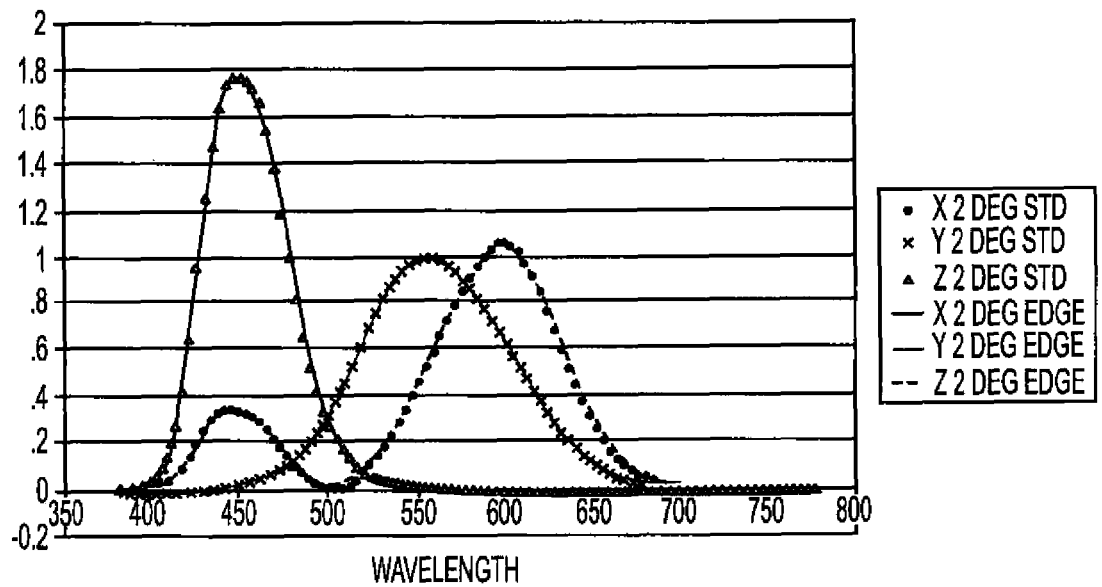
FIG. 4 shows a graph highlighting actual XYZ observer functions versus results of calculating LMS and converting to XYZ in accordance with an embodiment of the invention.

The resulting plots for LMS are shown in FIG. 1. FIGS. 2 and 3 highlight the color matching functions predicted versus data at full scale for R and magnified ×25 for G and B. Finally, FIG. 4 shows actual XYZ observer functions vs. the results of calculating LMS and converting to XYZ via the inverse of the Hunt-Pointer-Estivez matrix.

The simple parameterization of LMS above gives surprisingly good results. A least squares fit was performed in order to optimize the parameters above using the spectral cmf data of Guild and Wright. The cost function to be minimized was a combination of ΔE difference between CIEXYZ and EdgeXYZ for monochromatic light for D50 illumination for a white reflector and for 32 monochromatic light source spectra of power ⅓ of the corresponding white reflector ranging from 380 nm to 730 nm and the difference between the spectral response of CIEXYZ and EdgeXYZ with a weighting factor of 100 in order to correspond roughly to the range of CIELAB. The average and max ΔE results were calculated for the above after performing the LSF, and separate test data was used to confirm further the validity of the EdgeXYZ vs. CIEXYZ functions. The test data comprised of 262 reflective spectral measurements of Matchprint Digital samples, including all permutations of 0%, 40%, 70%, and 100% tints for CMYK.

The following parameters shown in Table 2 below give an average error of 1.2 ΔE and a maximum error of 6.0 ΔE between CIEXYZ for the 2 degree observer and the EdgeXYZ for D50 white and for the extreme case of the monochromatic light stimuli (noting that typical values of chroma were 100-250), and average and max errors of 0.2 ΔE and 0.6 ΔE respectively for the 262 test Matchprint colors:

TABLE 2

| Calculated Parameters for EdgeXYZ | | | |
|---|---|---|---|
| XYZParamName | LMS_L | LMS_M | LMS_S |
| m_LMS_alpha = | 0.946 | 1.088 | 1.777 |
| m_LMS_lambda = | 575.839 | 546.015 | 451.285 |
| m_LMS_gamma1 = | 2.806 | 1.903 | 4.067 |
| m_LMS_gamma2 = | 2.507 | 2.150 | 1.840 |
| m_LMS_DeltaLambda1 = | 32.786 | 24.490 | 15.920 |
| m_LMS_DeltaLambda2 = | 30.023 | 30.563 | 17.000 |
| m_LMS_delta1 = | −0.006 | −0.003 | −0.032 |
| m_LMS_delta2 = | −0.003 | −0.002 | −0.003 |
| m_LMS_DeltaGamma1 = | −0.005 | −0.011 | −0.009 |
| m_LMS_DeltaGamma2 = | −0.001 | −0.002 | −0.001 |

Figure 5:
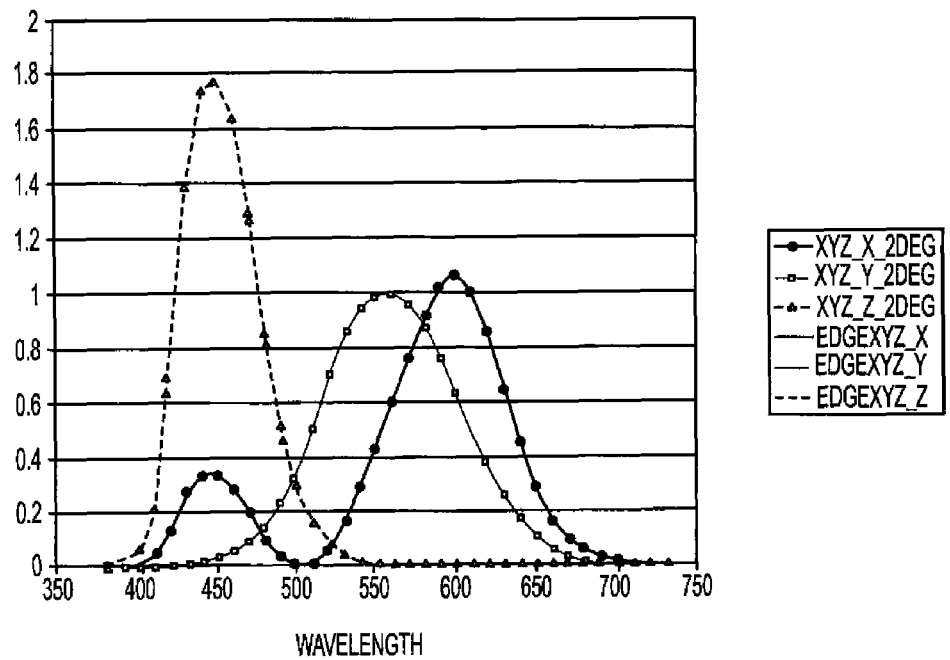
FIG. 5 shows a graph highlighting plots for CIEXYZ versus EdgeXYZ in accordance with an embodiment of the invention.
Figure 6:
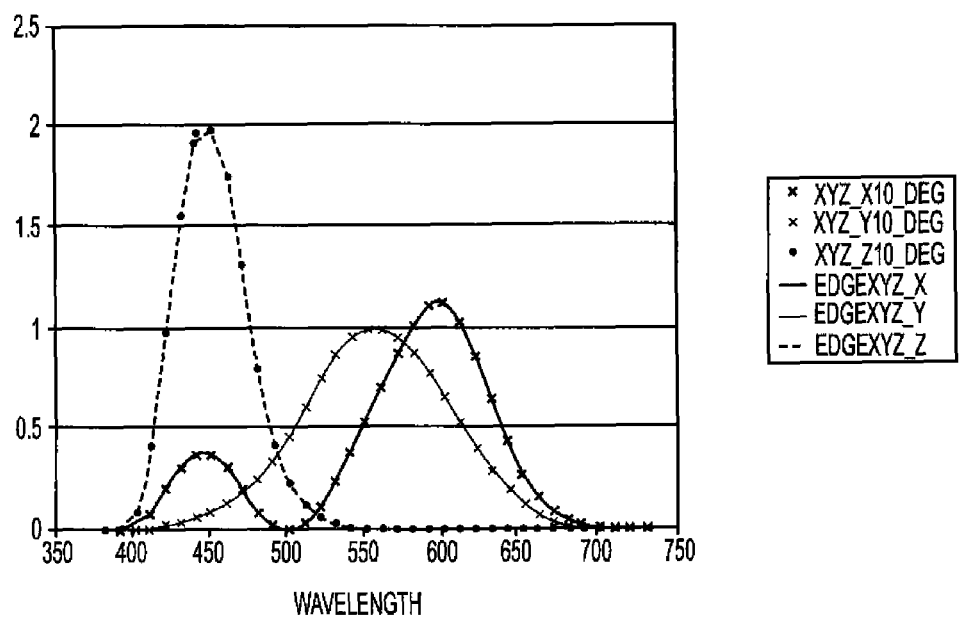
FIG. 6 shows a graph highlighting plots for EdgeXYZ versus CIEXYZ for 10 degree observer functions in accordance with an embodiment of the invention.

This resulted in the plots for CIEXYZ vs. EdgeXYZ as shown in FIG. 5. In a similar fashion, the EdgeXYZ parameterization was performed on the CIEXYZ 10-degree observer functions, resulting in an average and max error between the model and the standard observer of 0.98 ΔE and 5.1 ΔE for D50 white and for the monochromatic colors of the visible spectrum as shown in Table 3, results are shown in FIG. 6.

TABLE 3

| Calculated Parameters for EdgeXYZ | | | |
|---|---|---|---|
| XYZParamName | LMS_L | LMS_M | LMS_S |
| m_LMS_alpha = | 0.991 | 1.073 | 2.000 |
| m_LMS_lambda = | 572.880 | 543.272 | 450.040 |
| m_LMS_gamma1 = | 2.315 | 1.652 | 2.571 |
| m_LMS_gamma2 = | 2.844 | 2.075 | 1.839 |
| m_LMS_DeltaLambda1 = | 34.080 | 28.833 | 17.021 |
| m_LMS_DeltaLambda2 = | 31.069 | 33.034 | 15.813 |
| m_LMS_delta1 = | −0.003 | 0.001 | 0.004 |
| m_LMS_delta1 = | −0.005 | 0.000 | −0.004 |
| m_LMS_DeltaGamma1 = | 0.000 | −0.002 | −0.002 |
| m_LMS_DeltaGamma2 = | 0.000 | 0.000 | −0.002 |

The fact that the EdgeXYZ model can simulate either the 2 or 10 degree observer to an average of 1ΔE for the extreme case of monochromatic colors is a very good indicator that the model should be satisfactory for optimizing the existing CIEXYZ observer based on all available cmf data. Since 1ΔE is a good confirmation of a good model, one should also ask how consistent are the two existing standards (2 and 10 degree) to one another. This comparison can be performed either by calculating XYZ for each observer for D50 and for each monochromatic color of wavelength λ in order to calculate L*a*b* and therefore ΔE, or by calculating values of RGB for a particular set of tristimulous colors $\vec{\lambda}_T$ in order to match each monochromatic color of wavelength λ for one observer and asking how large is the calculated ΔE between these two "matching" colors according to the other observer (note that any negative values of R, G, or B can be added to the monochromatic stimuli in order to ensure positive values of calculated XYZ for the two colors).

Thus, when the same quality criteria is applied for comparing the consistency of the 2 and 10 degree standards to one another, it is found that pairs of saturated colors (such as used to obtain cmfs) that are predicted to be a match by the 2 degree observer generally will not be predicted to match by the 10 degree observer, and vice versa. In fact, the two observers disagree by an average and maximum error of 11 $\Delta E$ and 76 $\Delta E$, respectively, for saturated colors. If both models are used to optimize the EdgeXYZ model, the model will now have an average and max error of 6 $\Delta E$ and 40 $\Delta E$ for each of the two observers for the monochromatic colors of the spectrum.

Figure 7:
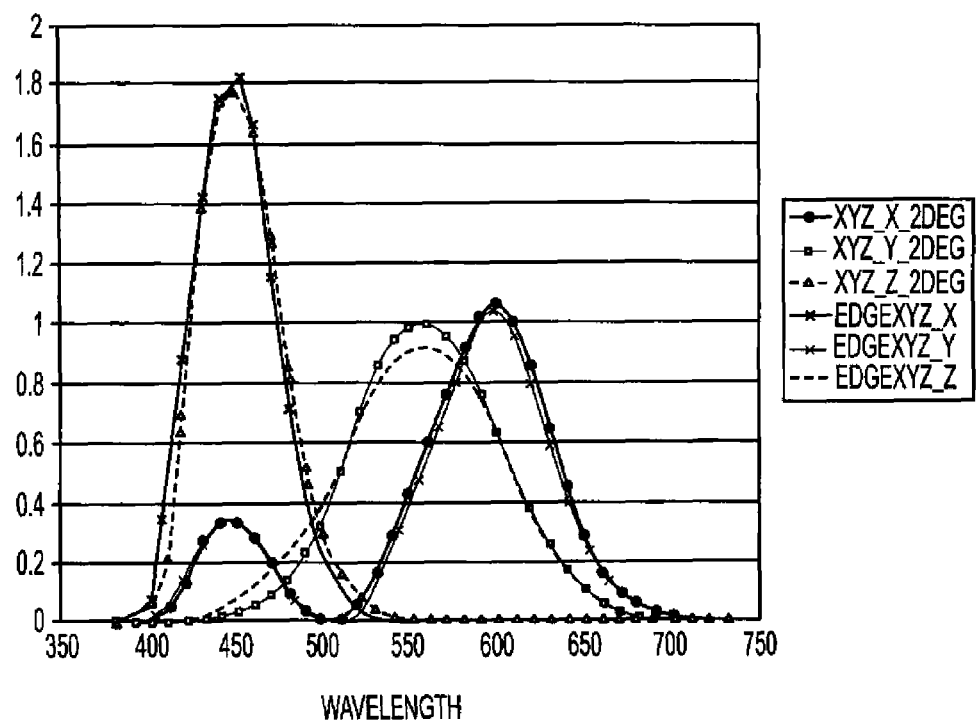
FIG. 7 shows a graph highlighting a plot of EdgeXYZ model for 10 degree observers to compare with 2 degree standard with similar white normalization in accordance with an embodiment of the invention.

The validity of the above assessment can be confirmed by simple visual comparison of the 2 and 10-degree observers as shown in FIG. 7 where the accurate EdgeXYZ model for 10 degree has been used to compare with the 2 degree standard with a similar white normalization. The plot shows significant differences, particularly in the vicinity of wavelength 480 nm where we can clearly see values of Y=0.14 and Y=0.24 for the 2 degree and 10 degree observers, respectively. This seemingly small error of 10% is retained after the cube root functions contained in the expressions for CIELAB are applied. This results in a 10$\Delta E$ difference in L* (due to the factor of 100 in the equations for L*) and a 50 $\Delta E$ difference in a* (due to the factor of 500 in the equations for a*). It should be noted that the 10 degree cmfs obtained by Stiles and Burch were actually a repeat of 2 degree cmfs they obtained. The differences between the standard 2 and 10 degree observers was never truly reconciled, thereby resulting in 2 conflicting standards.

If one observes a split circle containing two adjacent matching colors with a size equivalent to 2 degrees, that pair of matching colors will not differ in appearance by 50 $\Delta E$ merely by increasing its size to the equivalent of 10 degrees.

Since there is quite a large gap between the 2 and 10 degree observer functions, it may well be that one or the other is a better representation of human color vision. It is proposed therefore that improved CIEXYZ functions be determined by optimization of the EdgeXYZ parameters demonstrated in the above examples. This optimization can use the 2 degree observer functions as the baseline or the 10 degree functions. The optimization includes a diverse sampling of metameric pairs of colors with significantly different spectral power distributions (SPDs), neutral white in particular since (as pointed out by Fairchild) the eye is very sensitive to gray balance. Metamers or metameric pairs are stimuli that are spectrally different but visually identical to the human eye.

The optimization above will now be farther clarified and modified to include pairs of metameric matches with significantly different SPDs in order to determine optimized human observer functions. Starting with the human observer functions, the functions of $\lambda$ and the EdgeXYZ characterization parameters are as follows:

$$\overrightarrow{xyz}_E(\lambda, \vec{\alpha}, \vec{\lambda}, \overrightarrow{\Delta\lambda_1}, \overrightarrow{\Delta\lambda_2}, \vec{\gamma}_1, \vec{\gamma}_2, \vec{\delta}_1, \vec{\delta}_2, \overrightarrow{\Delta\gamma_1}, \overrightarrow{\Delta\gamma_2}) = \qquad \text{Eq. (3-1)}$$
$$M_{LMS \to XYZ} \overrightarrow{lms}_E(\lambda, \vec{\alpha}, \vec{\lambda}, \overrightarrow{\Delta\lambda_1}, \overrightarrow{\Delta\lambda_2}, \vec{\gamma}_1, \vec{\gamma}_2, \vec{\delta}_1, \vec{\delta}_2, \overrightarrow{\Delta\gamma_1}, \overrightarrow{\Delta\gamma_2})$$

where $$\vec{\alpha} = \begin{pmatrix} \alpha_L \\ \alpha_M \\ \alpha_S \end{pmatrix}, \vec{\lambda} = \begin{pmatrix} \lambda_L \\ \lambda_M \\ \lambda_S \end{pmatrix}, \overrightarrow{\Delta\lambda_1} = \begin{pmatrix} \Delta\lambda_{1L} \\ \Delta\lambda_{1M} \\ \Delta\lambda_{1S} \end{pmatrix}, \overrightarrow{\Delta\lambda_2} = \begin{pmatrix} \Delta\lambda_{2L} \\ \Delta\lambda_{2M} \\ \Delta\lambda_{2S} \end{pmatrix}, \qquad \text{Eq. (3-2)}$$

$$\vec{\gamma}_1 = \begin{pmatrix} \gamma_{1L} \\ \gamma_{1M} \\ \gamma_{1S} \end{pmatrix}, \vec{\gamma}_2 = \begin{pmatrix} \gamma_{2L} \\ \gamma_{2M} \\ \gamma_{2S} \end{pmatrix}, \vec{\delta}_1 = \begin{pmatrix} \delta_{1L} \\ \delta_{1M} \\ \delta_{1S} \end{pmatrix}, \vec{\delta}_2 = \begin{pmatrix} \delta_{2L} \\ \delta_{2M} \\ \delta_{2S} \end{pmatrix},$$

$$\overrightarrow{\Delta\gamma_1} = \begin{pmatrix} \Delta\gamma_{1L} \\ \Delta\gamma_{1M} \\ \Delta\gamma_{1S} \end{pmatrix}, \overrightarrow{\Delta\gamma_2} = \begin{pmatrix} \Delta\gamma_{2L} \\ \Delta\gamma_{2M} \\ \Delta\gamma_{2S} \end{pmatrix}$$

The cost function to be minimized is the sum of two summations. The first summation combines the squared errors between EdgeXYZ human observer functions $\bar{x}(\lambda), \bar{y}(\lambda), \bar{z}(\lambda)$ and CIEXYZ human observer functions $\bar{x}(\lambda), \bar{y}(\lambda), \bar{z}(\lambda)$ (either 2 degree, 10 degree, or both). The first summation extends over $N_\lambda$ wavelengths across the visible spectrum. The second summation combines the squared $\Delta E$ errors between calculated pairs of visually matching spectra $S_{ij}(\lambda)$, where i=1 to $N_s$, the number of sample pairs and j=1, 2 denotes each of the two samples in each pair:

$$Err(\vec{\alpha}, \vec{\lambda}, \overrightarrow{\Delta\lambda_1}, \overrightarrow{\Delta\lambda_2}, \vec{\gamma}_1, \vec{\gamma}_2, \vec{\delta}_1, \vec{\delta}_2, \overrightarrow{\Delta\gamma_1}, \overrightarrow{\Delta\gamma_2}) = 100.0 \sum_{i=1}^{i=N_\lambda} \qquad \text{Eq. (3-3)}$$

$$[\overrightarrow{xyz}_E(\lambda_i, \vec{\alpha}, \vec{\lambda}, \overrightarrow{\Delta\lambda_1}, \overrightarrow{\Delta\lambda_2}, \vec{\gamma}_1, \vec{\gamma}_2, \vec{\delta}_1, \vec{\delta}_2, \overrightarrow{\Delta\gamma_1}, \overrightarrow{\Delta\gamma_2})) - \overrightarrow{xyz}(\lambda_i)]^2 +$$

$$\sum_{i=1}^{i=N_s} [\overrightarrow{Lab}(\overrightarrow{XYZ}_E(S_{i1}(\lambda), \vec{\alpha}, \vec{\lambda}, \overrightarrow{\Delta\lambda_1}, \overrightarrow{\Delta\lambda_2}, \vec{\gamma}_1, \vec{\gamma}_2, \vec{\delta}_1, \vec{\delta}_2, \overrightarrow{\Delta\gamma_1}, \overrightarrow{\Delta\gamma_2})) -$$

$$\overrightarrow{Lab}(\overrightarrow{XYZ}_E(S_{i2}(\lambda), \vec{\alpha}, \vec{\lambda}, \overrightarrow{\Delta\lambda_1}, \overrightarrow{\Delta\lambda_2}, \vec{\gamma}_1, \vec{\gamma}_2, \vec{\delta}_1, \vec{\delta}_2, \overrightarrow{\Delta\gamma_1}, \overrightarrow{\Delta\gamma_2}))]^2$$

where $$\overrightarrow{XYZ}_E(S_{ij}(\lambda), \vec{\alpha}, \vec{\lambda}, \overrightarrow{\Delta\lambda_1}, \overrightarrow{\Delta\lambda_2}, \vec{\gamma}_1, \vec{\gamma}_2, \vec{\delta}_1, \vec{\delta}_2, \overrightarrow{\Delta\gamma_1}, \overrightarrow{\Delta\gamma_2}) = \qquad \text{Eq. (3-4)}$$

$$\int S_{ij}(\lambda) \overrightarrow{xyz}_E(\lambda, \vec{\alpha}, \vec{\lambda}, \overrightarrow{\Delta\lambda_1}, \overrightarrow{\Delta\lambda_2}, \vec{\gamma}_1, \vec{\gamma}_2, \vec{\delta}_1, \vec{\delta}_2, \overrightarrow{\Delta\gamma_1}, \overrightarrow{\Delta\gamma_2}) d\lambda$$

Note that the XYZ values of D50 white must be calculated using EdgeXYZ and included in the calculation of L*a*b* from XYZ.

In order to include the historical cmf data that was used to create either the 2 degree or the 10 degree observer functions into the above optimization, matching spectral pairs can be constructed using tristimulous intensities R, G, B with spectra in the form of Dirac delta functions and a reference color of wavelength λ (also in the form of a Dirac delta function) which have the same values of XYZ using standard observer functions.

Alternatively, one can calculate $XYZ_{i1}$ and $XYZ_{i2}$ for the monochromatic light using EdgeXYZ and the CIEXYZ observer functions. There are several mathematically equivalent methods in order to include the historical cmfs: one key is to add pairs of spectra for an adequate sampling of λ that are "matching pairs" as defined by a particular set of CIEXYZ observer functions.

The above cost function is minimized using such methods as Powell's method by optimization of the EdgeXYZ parameters. This was the method used to construct the examples above for the 2 and 10 degree observers. All that remains is to add more pairs of visually matching spectra in order to minimize the cost function thereby resulting in improved XYZ human observer functions.

A significant research effort was performed on this topic and published by Thornton, resulting in a multi-part series of articles in *Color Research and Applications, Toward a More Accurate and Extensible Colorimetry. Part VI. Improved Weighting Functions. Preliminary Results*, pp. 226-233. The heart of his work, which evolved from his experience in the fluorescent lighting industry, was to create five white light sources with extremely different SPDs that were assessed by several observers as being good visual metameric matches to one another. The fact that the values of XYZ and CIELAB that resulted from the SPDs of these five light sources were significantly different led to Thornton's conclusion that the human observer functions required significant improvement. The numerical data characterizing the SPD of these sources was never made public. However, the SPD of one pair of whites was communicated to Mark Shaw of RIT (*Evaluating the* 1931 *CIE Color Matching Functions*). The SPDs of the five white light sources were presented in Thornton's publications in the form of graphs. By digitizing these graphs, the original data was extracted. By comparing two of the extracted data sets with the pair of SPDs communicated to Shaw, it was confirmed that the data extracted from Thornton's graphs was reasonably accurate and could be used for validating and optimizing CIEXYZ.

It was confirmed that the 2 degree observer calculates significant ΔE differences between these five matching white light sources and their average calculated L*a*b*. The following table calculates L*a*b* and XYZ reference values based on the 2 degree observer for the five light sources as shown in Table 4 below.

TABLE 4

| L* ref | a* ref | b* ref | X ref | Y ref | Z ref |
|---|---|---|---|---|---|
| 55.68 | −27.26 | 15.56 | 17.25 | 23.60 | 13.00 |
| 53.74 | −19.42 | 11.01 | 17.15 | 21.73 | 13.44 |
| 55.09 | −11.98 | 7.18 | 19.69 | 23.01 | 15.84 |
| 53.61 | −5.76 | 5.63 | 19.65 | 21.60 | 15.43 |
| 54.44 | −12.15 | 6.34 | 19.10 | 22.39 | 15.73 |

Although the values of L* are similar, there are clearly large disagreements between the calculated values of a* and b*.

Table 5 was calculated using EdgeXYZ optimized for the 2 degree observer. Also calculated are the corresponding ΔE errors between each white light source and the average of all the sources:

TABLE 5

| L* Edge | a* Edge | b* Edge | X Edge | Y Edge | Z Edge | Delta E |
|---|---|---|---|---|---|---|
| 56.00 | −28.61 | 15.04 | 17.25 | 23.91 | 13.39 | 14.17 |
| 54.04 | −20.84 | 10.46 | 17.13 | 22.01 | 13.84 | 5.16 |
| 55.25 | −12.17 | 6.75 | 19.79 | 23.17 | 16.13 | 4.37 |
| 53.32 | −6.24 | 5.20 | 19.31 | 21.34 | 15.40 | 10.46 |
| 54.25 | −12.23 | 6.07 | 18.92 | 22.21 | 15.70 | 4.63 | ave Delta E = 7.76
max Delta E = 14.17

Figure 8:
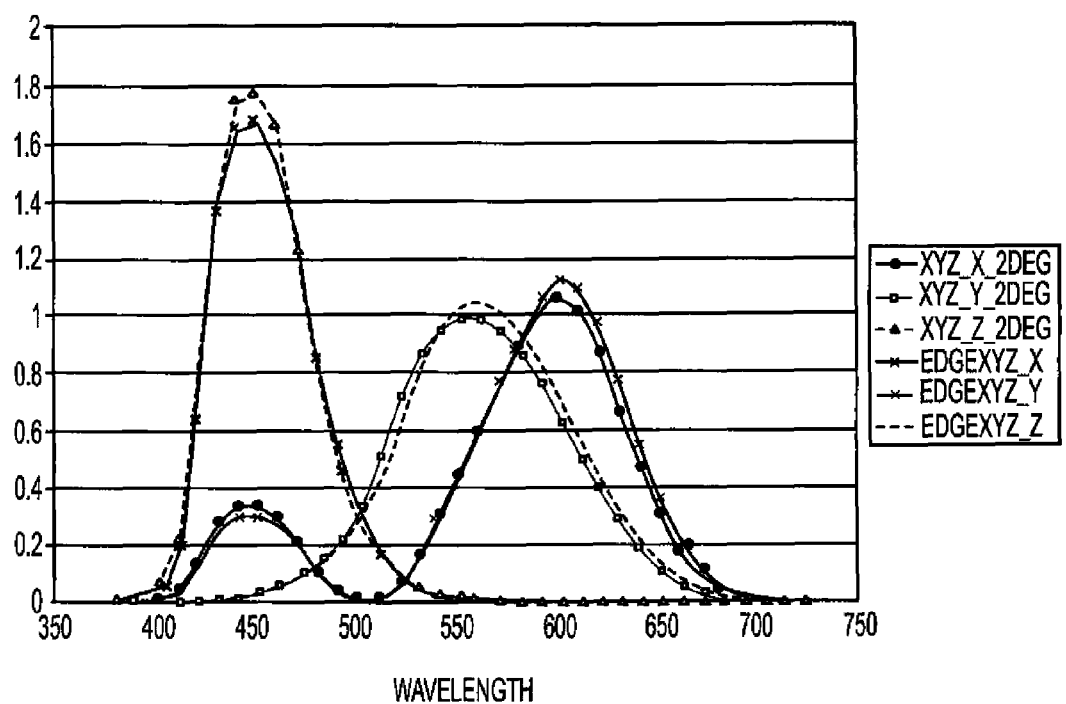
FIG. 8 shows a graph highlighting a plot of EdgeXYZ versus the 2 degree standard observer in accordance with an embodiment of the invention.

Optimizing the EdgeXYZ parameters to minimize this large ΔE error can be performed as described in Equation (3-3) above. Since the original cmf data was obtained using saturated colors and had significant variability as shown in FIG. 8-1 in the next section, and since Thornton's set of 5 metameric colors were all matching whites as confirmed by 8 observers (white balance being very sensitive to the eye), a weighting factor of 3 was chosen to give preference to minimizing the ΔE error for the matching whites vs. the ΔE error calculated from the cmf data of the 2 degree observer. This weighting factor was achieved by dividing each of the two summations in the cost function indicated in Equation (3-3) by $N_\lambda$ and $N_s$ respectively in order to define the average sum squared error for each of the two summations, then multiplying the latter summation by 9.0 (i.e. $3^2$ since a weighting factor of 3 in ΔE implies a weighting factor of 9 in the square of ΔE).

The resulting minimization of the cost function gave the following EdgeXYZ parameters shown in Table 6.

TABLE 6

| Calculated Parameters for EdgeXYZ | | | |
|---|---|---|---|
| XYZParamName | LMS_L | LMS_M | LMS_S |
| m_LMS_alpha = | 0.9865 | 1.1358 | 1.6802 |
| m_LMS_lambda = | 581.2820 | 548.3070 | 451.7720 |
| m_LMS_gamma1 = | 3.2521 | 1.7375 | 4.4494 |
| m_LMS_gamma2 = | 2.4281 | 2.1655 | 1.6806 |
| m_LMS_DeltaLambda1 = | 32.8056 | 22.8717 | 16.5772 |
| m_LMS_DeltaLambda2 = | 28.5968 | 30.4839 | 17.7028 |
| m_LMS_delta1 = | −0.0087 | −0.0047 | −0.0351 |
| m_LMS_delta1 = | −0.0022 | −0.0014 | 0.0002 |
| m_LMS_DeltaGamma1 = | −0.0052 | −0.0350 | −0.0035 |
| m_LMS_DeltaGamma2 = | 0.0020 | 0.0013 | 0.0017 |

The resulting minimization provided the plot of EdgeXYZ versus the 2 degree standard observer as shown in FIG. 8. The improvement to the calculated ΔE between the five matching whites was significant as shown in Table 7.

TABLE 7

| L* Edge | a* Edge | b* Edge | X Edge | Y Edge | Z Edge | Delta E |
|---|---|---|---|---|---|---|
| 54.05 | −13.54 | 11.52 | 18.51 | 22.03 | 13.45 | 3.01 |
| 53.02 | −13.25 | 9.18 | 17.71 | 21.06 | 13.66 | 1.89 |
| 55.42 | −12.29 | 8.40 | 19.92 | 23.34 | 15.58 | 1.66 |
| 53.84 | −10.24 | 8.56 | 18.96 | 21.82 | 14.43 | 1.58 |
| 54.06 | −9.10 | 8.11 | 19.38 | 22.03 | 14.75 | 2.79 | ave Delta E = 2.19
max Delta E = 3.01

The conclusion for the above analysis is that the CIEXYZ 2-degree observer is quite reasonable qualitatively. The observer data itself is valid but it merely contained +/− uncertainty that was never fully confronted.

The above analysis clearly illustrates that if the 2-degree observer is varied within the known uncertainty of the data variability, sets of matching whites such as the light sources can be dramatically improved in terms of the predicted ΔE match between them. Rather than attempting to do this by varying all 32 discrete wavelengths or by varying functions that have no physical basis for the CIE observer functions, the obvious optimization is to vary their key fundamental attributes such as: the max wavelength, the width and shape of each side of the quasi-Gaussian peaks of the $\bar{l}(\lambda), \bar{m}(\lambda), \bar{s}(\lambda)$ sensitivity curves, and if necessary other slight empirical corrections as illustrated above.

Error minimization was performed on a combination of Thornton data above and corresponding Alvin data from Rochester Institute of Technology (RIT) that compared neutral gray print and transparency to the corresponding RGB color on a CRT. Table 8 indicates the errors between pairs of metamers calculated with CIEXYZ using the EdgeXYZ model 2 degree observer:

TABLE 8

| L* Edge | a* Edge | b* Edge | X Edge | Y Edge | Z Edge | Delta E |
|---|---|---|---|---|---|---|
| 56.00 | −28.61 | 15.04 | 17.25 | 23.91 | 13.39 | 0.00 |
| 54.04 | −20.84 | 10.46 | 17.13 | 22.01 | 13.84 | 9.23 |
| 56.00 | −28.61 | 15.04 | 17.25 | 23.91 | 13.39 | 0.00 |
| 55.25 | −12.17 | 6.75 | 19.79 | 23.17 | 16.13 | 18.43 |
| 56.00 | −28.61 | 15.04 | 17.25 | 23.91 | 13.39 | 0.00 |
| 54.25 | −12.23 | 6.07 | 18.92 | 22.21 | 15.70 | 18.76 |
| 56.00 | −28.61 | 15.04 | 17.25 | 23.91 | 13.39 | 0.00 |
| 53.32 | −6.24 | 5.20 | 19.31 | 21.34 | 15.40 | 24.58 |
| 100.02 | −15.24 | −6.35 | 87.92 | 100.06 | 90.65 | 0.00 |
| 99.99 | −18.47 | −14.62 | 86.11 | 99.98 | 101.92 | 8.88 |
| 100.04 | −9.50 | 7.88 | 91.13 | 100.10 | 73.20 | 0.00 |
| 99.92 | −11.94 | 3.95 | 89.48 | 99.78 | 77.52 | 4.62 | ave Delta E = 14.08
max Delta E = 24.58

In Table 9, the results of calculating the metameric pairs after optimizing the EdgeXYZ parameters are shown.

TABLE 9

| L* Edge | a* Edge | b* Edge | X Edge | Y Edge | Z Edge | Delta E |
|---|---|---|---|---|---|---|
| 54.15 | −10.34 | 10.66 | 19.21 | 22.11 | 13.83 | 0.00 |
| 53.17 | −11.25 | 10.21 | 18.22 | 21.21 | 13.38 | 1.41 |
| 54.15 | −10.34 | 10.66 | 19.21 | 22.11 | 13.83 | 0.00 |
| 54.65 | −10.05 | 9.99 | 19.69 | 22.59 | 14.41 | 0.88 |
| 54.15 | −10.34 | 10.66 | 19.21 | 22.11 | 13.83 | 0.00 |
| 53.52 | −10.64 | 9.29 | 18.63 | 21.53 | 13.94 | 1.54 |
| 54.15 | −10.34 | 10.66 | 19.21 | 22.11 | 13.83 | 0.00 |
| 55.18 | −8.53 | 11.75 | 20.47 | 23.10 | 14.09 | 2.35 |
| 99.53 | −9.01 | −4.60 | 90.17 | 98.79 | 87.27 | 0.00 |
| 99.82 | −9.98 | −9.72 | 90.32 | 99.53 | 94.69 | 5.22 |
| 99.53 | −0.24 | 8.85 | 95.12 | 98.80 | 71.11 | 0.00 |
| 100.34 | −2.44 | 9.06 | 95.86 | 100.88 | 72.45 | 2.35 | ave Delta E = 2.29
max Delta E = 5.22

Table 10 shows the parameters that achieved the results above.

TABLE 10

Calculated Parameters for EdgeXYZ

| XYZParamName | LMS_L | LMS_M | LMS_S |
|---|---|---|---|
| m_LMS_alpha = | 0.940 | 1.140 | 1.806 |
| m_LMS_lambda = | 579.036 | 542.416 | 442.246 |
| m_LMS_gamma1 = | 3.196 | 1.878 | 2.400 |
| m_LMS_gamma2 = | 3.962 | 1.768 | 1.179 |
| m_LMS_DeltaLambda1 = | 31.569 | 18.619 | 11.883 |
| m_LMS_DeltaLambda2 = | 30.837 | 34.646 | 21.228 |
| m_LMS_delta1 = | 0.018 | −0.006 | −0.009 |
| m_LMS_delta1 = | −0.012 | 0.005 | 0.007 |
| m_LMS_DeltaGamma1 = | 0.017 | −0.006 | 0.010 |
| m_LMS_DeltaGamma2 = | 0.002 | 0.002 | 0.002 |

Table 6-9

Figure 9:
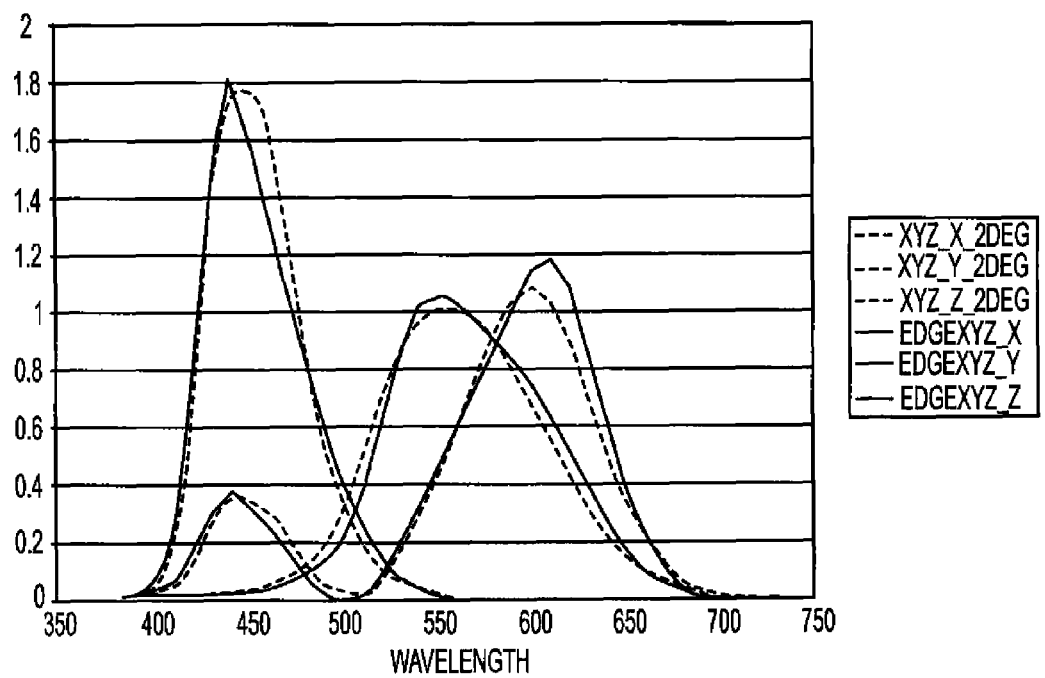
FIG. 9 shows a plot of EdgeXYZ versus CIEXYZ (2 degree observer) in accordance with an embodiment of the invention.

In FIG. 9, the plots of EdgeXYZ vs. CIEXYZ (2 degree observer) are highlighted.

It is interesting to note that the primary impact of the Alvin data together with the Thornton data is to sharpen the characterization of the EdgeXYZ_Z observer function. This rather sharp behavior may be smoothed by attempting to split the single quasi-Gaussian $\bar{s}(\lambda)$ blue cone response into two overlapping quasi-Gaussians in one embodiment. This would require fitting an extra set of parameters for peak wavelength, left/right width, left/right exponential power, etc.

In view of the above results, and in view of the characterization of Pokorney et al. who observed structure in the $\bar{s}(\lambda)$ blue cone response, a second quasi-Gaussian was added to characterize $\bar{s}(\lambda)$. This second Gaussian was constrained to be higher in value of peak λ and to vary in magnitude between 0.0 and 0.9 of the magnitude of the primary quasi-Gaussian defining $\bar{s}(\lambda)$. In order to minimize the number of adjustable parameters, the same values of width, gamma, etc. were used for both curves defining $\bar{s}(\lambda)$. Only the amplitude and peak wavelength of this second curve was permitted to vary independently.

The resulting characterization of $\bar{s}(\lambda)$ had approximately the same improvement to the data set of Thornton and Alvin as observed above. However, the maximum error between this modified set of curves vs. the historical 1931 cmf data (i.e. errors for maximum saturated monochromatic colors) was reduced from 48 ΔE to 25 ΔE.

Table 11 below indicates the parameters for L and M, and for the two quasi-Gaussian peaks S1 and S2 which were combined to form S(λ):

TABLE 11

Calculated Parameters for EdgeXYZ

| XYZParamName | LMS_L | LMS_M | LMS_S1 | LMS_S2 |
|---|---|---|---|---|
| m_LMS_alpha = | 0.929 | 1.119 | 1.379 | 0.914 |
| m_LMS_lambda = | 580.331 | 545.162 | 436.343 | 462.305 |
| m_LMS_gamma1 = | 3.622 | 1.840 | 1.206 | 1.192 |

TABLE 11-continued

Calculated Parameters for EdgeXYZ

| XYZParamName | LMS_L | LMS_M | LMS_S1 | LMS_S2 |
|---|---|---|---|---|
| m_LMS_gamma2 = | 3.216 | 1.956 | 1.206 | 1.192 |
| m_LMS_DeltaLambda1 = | 32.815 | 20.435 | 7.309 | 16.474 |
| m_LMS_DeltaLambda2 = | 29.825 | 32.730 | 7.309 | 16.474 |
| m_LMS_delta1 = | −0.007 | −0.005 | 0.010 | 0.007 |
| m_LMS_delta1 = | −0.007 | 0.002 | 0.010 | 0.007 |
| m_LMS_DeltaGamma1 = | 0.007 | −0.011 | −0.005 | 0.008 |
| m_LMS_DeltaGamma2 = | 0.003 | 0.002 | −0.005 | 0.008 |

Figure 10:
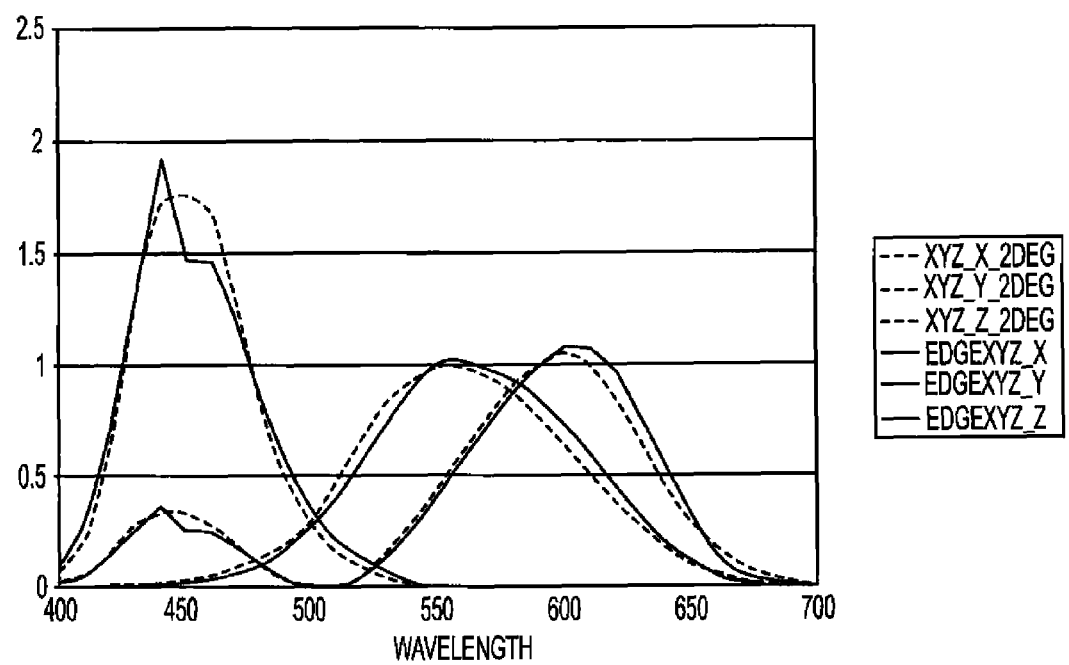
FIG. 10 shows a graph highlighting plots for $\bar{s}(\lambda)$ in accordance with an embodiment of the invention.

The plots for $\bar{z}(\lambda)$ (and hence for $\bar{s}(\lambda)$) shown in FIG. 10. The above is merely an example of how $\bar{x}(\lambda),\bar{y}(\lambda),\bar{z}(\lambda)$ can be parameterized. Illustrative examples of mathematical modeling to achieve even greater accuracy relative to existing standards in accordance with other embodiments are as follows:

1) Adding more parameters to characterize the LMS cone responses using, for example, splines with a limited number of knot points; and
2) Use existing CIEXYZ observer functions $\bar{x}(\lambda),\bar{y}(\lambda),\bar{z}(\lambda)$ (either 2 or 10 degree) as the baseline function and create a $\Delta\bar{x}(\lambda),\Delta\bar{y}(\lambda),\Delta\bar{z}(\lambda)$ function using the parameterized EdgeXYZ functions $\bar{x}(\lambda),\bar{y}(\lambda),\bar{z}(\lambda)$ above.

These additional methods may not be required since the EdgeXYZ parameterization described above appears to be an adequate model for both 2 and 10-degree observer functions. It also appears to be adequate relative to the current noise and inconsistencies of the historical cmf experiments. However, if desired, method #2 above has the advantage of ensuring that the exact original properties of CIEXYZ are preserved for $\Delta\bar{x}(\lambda),\Delta\bar{y}(\lambda),\Delta\bar{z}(\lambda)=0.0$, even slight imperfections in shapes of the LMS and $\Delta\bar{x}(\lambda),\Delta\bar{y}(\lambda),\Delta\bar{z}(\lambda)$ curves due to errors in the original human observer data.

The following example of this approach will use a simplified EdgeXYZ that does not adjust the minimum offset or the exponents used in the quasi-Gaussian functions for lms. The mathematical expression for the parameterized $\Delta\bar{x}(\lambda),\Delta\bar{y}(\lambda),\Delta\bar{z}(\lambda)$ is as follows:

$$\vec{xyz}_E(\lambda,\vec{\alpha},\vec{\lambda},\vec{\Delta\lambda_1},\vec{\Delta\lambda_2}) = \vec{xyz}_{CIE}(\lambda) + \Delta\vec{xyz}(\lambda,\vec{\alpha},\vec{\lambda},\vec{\Delta\lambda_1},\vec{\Delta\lambda_2}) \quad \text{Eq. (3-5)}$$

where $$\Delta\vec{xyz}(\lambda,\vec{\alpha},\vec{\lambda},\vec{\Delta\lambda_1},\vec{\Delta\lambda_2}) = \vec{xyz}_E(\lambda,\vec{\alpha},\vec{\lambda},\vec{\Delta\lambda_1},\vec{\Delta\lambda_2}) - \vec{xyz}_E(\lambda,\vec{\alpha_0},\vec{\lambda_0},\vec{\Delta\lambda_{01}},\vec{\Delta\lambda_{02}})$$

$$\vec{xyz}_E(\lambda,\vec{\alpha},\vec{\lambda},\vec{\Delta\lambda_1},\vec{\Delta\lambda_2}) = M_{LMS \to XYZ}\vec{lms}_E(\lambda,\vec{\alpha},\vec{\lambda},\vec{\Delta\lambda_1},\vec{\Delta\lambda_2})$$

$$\vec{xyz}_E(\lambda,\vec{\alpha_0},\vec{\lambda_0},\vec{\Delta\lambda_{01}},\vec{\Delta\lambda_{02}}) = M_{LMS \to XYZ}\vec{lms}_E(\lambda,\vec{\alpha_0},\vec{\lambda_0},\vec{\Delta\lambda_{01}},\vec{\Delta\lambda_{02}}) \quad \text{Eq. (3-6)}$$

and where $$\vec{a} = \begin{pmatrix} a_L \\ a_M \\ a_S \end{pmatrix}, \vec{\lambda} = \begin{pmatrix} \lambda_L \\ \lambda_M \\ \lambda_S \end{pmatrix}, \vec{\Delta\lambda_1} = \begin{pmatrix} \Delta\lambda_{1L} \\ \Delta\lambda_{1M} \\ \Delta\lambda_{1S} \end{pmatrix}, \vec{\Delta\lambda_2} = \begin{pmatrix} \Delta\lambda_{2L} \\ \Delta\lambda_{2M} \\ \Delta\lambda_{2S} \end{pmatrix} \quad \text{Eq. (3-7)}$$

The "0" subscript in the parameter vectors $\vec{\alpha_0},\vec{\lambda_0},\vec{\Delta\lambda_{01}},\vec{\Delta\lambda_{02}}$ above indicate that there are fixed baseline parameters that provide an optimal match to the CIEXYZ human observer functions $\bar{x}(\lambda),\bar{y}(\lambda),\bar{z}(\lambda)$. Thus, when the parameter vectors $\vec{\alpha},\vec{\lambda},\vec{\Delta\lambda_1},\vec{\Delta\lambda_2}$ equal the baseline parameter vectors $\vec{\alpha_0},\vec{\lambda_0},\vec{\Delta\lambda_{01}},\vec{\Delta\lambda_{02}}$, the $\vec{xyz}_E(\lambda)$ functions match the CIEXYZ human observer functions $\bar{x}(\lambda),\bar{y}(\lambda),\bar{z}(\lambda)$.

If the "fits" show a significant improvement between predicted match and actual visual match for all data, but still result in an error higher than expected from experimental noise, progressive refinements can be made to the modeling of the lms($\lambda$) functions. The number of adjustable parameters should be kept as low as possible while providing an adequate prediction of metameric matches between pairs of colors.

The resulting modified $\bar{x}(\lambda),\bar{y}(\lambda),\bar{z}(\lambda)$ can be characterized as a new definition of CIEXYZ or can be characterized as a correction $\alpha\bar{x}(\lambda),\Delta\bar{y}(\lambda),\Delta\bar{z}(\lambda)$ to the existing CIEXYZ standard. The nature of the corrections are fairly intuitive by mere visual inspection of the existing $\bar{l}(\lambda),\bar{m}(\lambda),\bar{s}(\lambda)$ functions from which the $\bar{x}(\lambda),\bar{y}(\lambda),\bar{z}(\lambda)$ functions are derived. The adjustments are in the way of adjusting the maximum amplitude, the wavelength where the maximum sensitivity occurs for each $\bar{l}(\lambda),\bar{m}(\lambda),\bar{s}(\lambda)$ peak, the width of each peak on either side of the maximum, and the shape of each curve (i.e. steepness at half-max) on either side of maximum. The mathematical model for defining these key attributes (amplitude, location of maximum, width and shape on either side of maximum) can be improved or modified, but must result in a smooth behavior.

The EdgeXYZ method constructs improved $\bar{x}(\lambda),\bar{y}(\lambda),\bar{z}(\lambda)$ observer functions that fulfill the following requirements:

1) The new $\bar{x}(\lambda),\bar{y}(\lambda),\bar{z}(\lambda)$ average observer functions are based on available cmf data, such as that of Guild and Wright and/or Stiles and Burch, as well as recently measured spectra of visually metameric pairs of colors including whites, as well as various saturated colors, obtained by Thornton and by Alvin.
2) The resulting new $\bar{x}(\lambda),\bar{y}(\lambda),\bar{z}(\lambda)$ are inherently smooth by means of constraining the number of modeling parameters to be much smaller than the typical number of wavelength samples (i.e. much smaller than 3×32 for all the observer functions $\bar{x}(\lambda),\bar{y}(\lambda),\bar{z}(\lambda)$), e.g. 3×10 parameters for EdgeXYZ in the example described in the previous section.
3) The resulting new $\bar{x}(\lambda),\bar{y}(\lambda),\bar{z}(\lambda)$ reduces the average $\Delta E$ discrepancy between metameric whites for a statistically significant population of observers.
4) The resulting new $\bar{x}(\lambda),\bar{y}(\lambda),\bar{z}(\lambda)$ also reduces the average $\Delta E$ discrepancy between highly chromatic metameric colors.
5) For a population of observers, any remaining errors between predicted matches based on a new $\bar{x}(\lambda),\bar{y}(\lambda),\bar{z}(\lambda)$ between numerically metameric colors and visually metameric colors should be confirmed to be due to random differences and variability between the observers.

This last requirement means that, for example, given a pair of metamers that are calculated to have similar values of XYZ using the new $\bar{x}(\lambda), \bar{y}(\lambda), \bar{z}(\lambda)$ functions, there will be a significant percentage of observers who say that the two colors are a reasonable match. For those who see a difference within that population, the "fix" to that difference should be equally distributed as corrections in directions of red, green, blue.

Any systematic improvements needed to the color match between calculated metamers that are consistent in color direction for the test population (for example, on average subjects see too much red in one of the two colors), should be regarded as an indication of something missing in the observer functions $\bar{x}(\lambda), \bar{y}(\lambda), \bar{z}(\lambda)$ or something not quite correct in our fundamental assumptions of how color matching should be predicted. While any non-systematic improvements (i.e. improvements equally distributed in all color directions for the population of observers) are likely due to a random distribution of observer-to-observer differences.

Methods for Improved Precision in the Acquisition of Observer Data

As noted above, the historical experiments for characterizing the CMFs using the saturation method have significant noise, on the order of 10%-20%. In light of today's knowledge of color appearance modeling, there are two complimentary experiments that may be performed in order to ensure an accurate characterization of the CMFs as well as to ensure that the revised LMS color responses will result in good predictions of matching colors in the vicinity of white. The latter improvement will be of great benefit particularly to the paper industry and to manufacturers of light sources that require tight specifications.

1) Improved saturation method of acquiring cmfs. The conventional color matching experiments may be compared to performing sensitive color adjustments on RGB images on a wide-gamut display with a gamma=1.0. One can easily recreate the problems associated with such testing by creating a wide gamut RGB working space in Adobe PhotoShop™ or other similar program and setting the value of gamma to 1. Existing images in common working spaces such as AdobeRGB or sRGB can be converted to the wide gamut RGB space with gamma=1. If the user proceeds to adjust colors using the "curve adjust" feature, one finds that colors shift very gradually for adjustments of R, G or B in the vicinity of 255, and that colors shift dramatically for adjustments in the vicinity of R,G, or B=0. This highly non-uniform response of color appearance to adjustments of RGB can lead to significant noise when performing human observer experiments. Thus, a simple modification to the original color matching experiments is to enable adjustments of quantities of RGB when matching reference colors such that the adjustments and the data acquired for those adjustments are performed with a gamma=2.2 rather than gamma=1.0. After the data has been acquired, averaged, etc. by multiple observers, the final results can be converted back to RGB linear space.

2) Modified Maxwell method for acquiring cmfs. It is known in color appearance modeling as well as the experience of graphic artists that the most sensitive regions of color shift are grays and skin tones. The former region of color space is well-suited for defining the LMS functions (and therefore XYZ) with an expected noise of 1%-2% rather than 10%-20%. This appeared to be true with at least some of the data acquired by North and Fairchild using the Maxwell method of matching whites. There are two modifications to the Maxwell approach that must be added. The first is to apply non-linear response such as a gamma curve to the adjustable R, G, B intensities in order to make adjustments to these intensities resemble the perceptual response of the eye. The second requirement would be to perform this experiment in a similar fashion to the historical experiments such as those of Guild and Wright and Stiles and Burch. Rather than using only seven discrete monochromatic wavelengths (per the experiment of North and Fairchild), the full visible spectrum would be scanned in relatively small increments such as 5-10 nm.

The noise and variability in the cmf data acquired by North and Fairchild seems large when one considers the sensitivity of the eye to white and gray balance. It would seem that the noise would be due to one or more of the following:

1) Lack of skill on the part of observers to find an optimal match via manual adjustment; and 2) Observer-to-observer differences.

It would be helpful to clarify the noise of obtaining cmf data from each individual in the experiment compared to the overall variability of the data. It would also be helpful to perform the following follow-up experiment: have one observer with demonstrated good color vision as well as skill in the process of matching colors decide on an optimal match for each wavelength λ using the Maxwell method of matching whites. Store the resulting RGB cmf values for each wavelength λ. Next proceed to query each observer for each set of wavelengths λ whether the reference and adjusted whites are a close match. One can even use that match as a starting point from which the observers can deviate $-/-\Delta r$, $\Delta g$, and $\Delta b$. If the noise and variability is similar between the standard unbiased experiment and the "$\Delta r$, $\Delta g$, and $\Delta b$" experiment, this would tend to support the assumption that there is significant observer-to-observer effects occurring.

On the other hand, if the resulting new observer cmf data is much more consistent and has a much smaller magnitude of noise for all the observers, we can conclude that lack of observer skill in the ability to find the optimal match is a significant factor, one that is not necessarily related to observer-to-observer differences.

The mathematical framework for the Maxwell method is similar to that of the saturation method. One begins by stipulating that XYZ of the white reference spectrum $S_W(\lambda')$ must be equal to the XYZ due the RGB CRT primaries plus the XYZ of the monochromatic light of wavelength λ:

$$\overrightarrow{XYZ}(S_W(\lambda')) = \overrightarrow{XYZ}_W \qquad \text{Eq. (4-1)}$$

$$= M_{XYZ}(\vec{S}_T(\lambda'))\overrightarrow{RGB}(\lambda, \vec{S}_T(\lambda')) + \overrightarrow{xyz}(\lambda)$$

$$\overrightarrow{RGB}(\lambda, \vec{S}_T(\lambda')) = (M_{XYZ}(\vec{S}_T(\lambda')))^{-1}(\overrightarrow{XYZ}_W - \overrightarrow{xyz}(\lambda))$$

$$= (M_{LMS \to XYZ}^{-1} M_{LMS}(\vec{S}_T(\lambda')))^{-1} M_{LMS \to XYZ}^{-1}$$

$$(\overrightarrow{LMS}_W - \overrightarrow{lms}(\lambda))$$

$$= M_{LMS}^{-1}(\vec{S}_T(\lambda')) M_{LMS \to XYZ}(\overrightarrow{LMS}_W - \overrightarrow{lms}(\lambda))$$

$$= M_{LMS}^{-1}(\vec{S}_T(\lambda'))(\overrightarrow{LMS}_W - \overrightarrow{lms}(\lambda))$$

Similar to the classic CMF experiments, the LMS cone responses can be parameterized and a least square fit performed to the CMF data to determine the most accurate characterization of LMS.

Improvements to LMS->XYZ

The scientific approach to color science with regards to XYZ has remained essentially unchanged since the early 1930's and may benefit from thinking about the human observer in light of today's technology. Rather than fixing or improving the basis for deriving XYZ from LMS, the approach has been to create newer, more complex CAMs that begin by converting XYZ to an LMS-type space using at least two well known different matrices in the art (Hunt-Pointer-Estevez and Bradford).

Since CIEXYZ and CIELAB continue to be used extensively and are the building blocks for the ICC formats, a good argument can be made for improving CIEXYZ and CIELAB to the point where the quality of the results for gamut mapping and chromatic adaptation are comparable to if not superior to existing CAMs for many common situations. It would be very beneficial if the color reproduction of saturated RGB images could be considered optimal if the color is reproduced on devices of much smaller gamuts.

In particular, just as the standard CIE observer functions are the basis of color management, the approaches used in color management may be helpful in redefining the basis for determining the CIE XYZ human observer functions. To do this preserving the term "XYZ" in order to emphasize that if successful, the impact on existing XYZ and CIELAB infrastructures would be minimal. However, the interpretation of the meaning of XYZ will be significantly changed.

Figure 11:
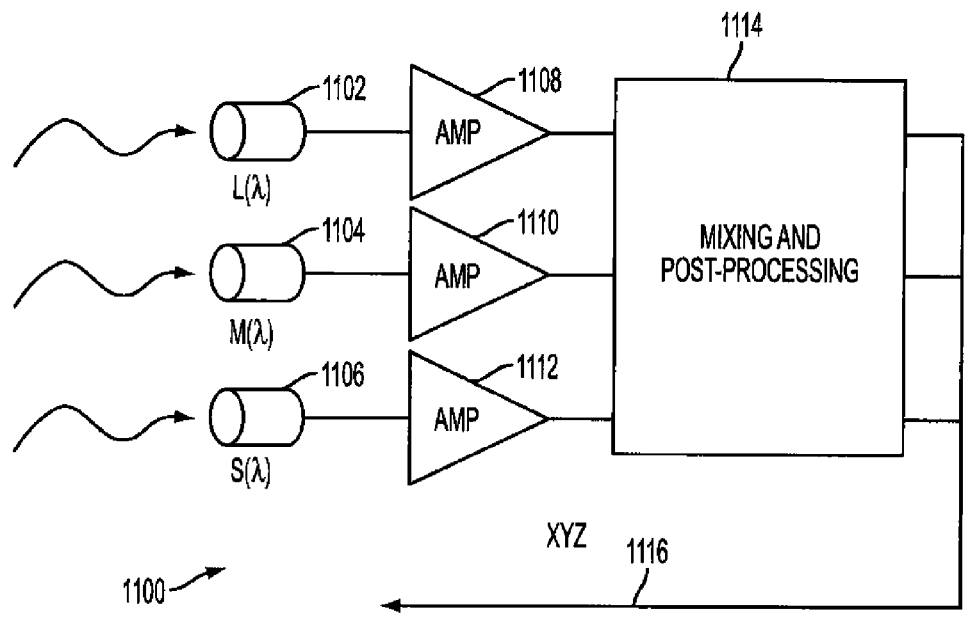
FIG. 11 shows a block diagram of a circuit that models a human observer in accordance with an embodiment of the invention.

A model for the human observer analogous to the construction of a digital camera is first constructed. It is assumed that the eye and brain comprise of RGB detectors (the cones) with linear response functions that are subsequently processed by circuitry and signal processing as illustrative shown in FIG. 11. System 1100 includes an $L(\lambda)$ receptor 1102, a $M(\lambda)$ receptor 1104, and an $S(\lambda)$ receptor 1106, each being amplified by corresponding amplifier 1110-1112 prior to being presented to a mixing and post-processing circuit 1114. The mixing and post-processing circuit 1114 performs the appropriate processing to generate the XYZ output 1116.

The term "XYZ" is continued to be used in order to maintain continuity with the past. However, we will now interpret "XYZ" to indicate the sensation of red, gray, and blue in the brain, as opposed to LMS which are the sensitivities of the cones in the eye. It already has been shown that color matching depends only on the LMS wavelength sensitivities of the cones in the eye. The fact that equal energy light appears white indicates that the integrals of LMS can be set to approximately equal values. It is assumed that the response to light striking each cone is truly linear not necessarily in terms of perception, but in terms of matching color. For example, if the LMS functions themselves were not linear in their additivity with regards to matching, one would expect a dramatically different amount of power required for the sum of three narrow bands RGB balanced for white vs. an equal energy spectrum of white light. The fact that the integrals resulting in XYZ for the two cases above are similar in magnitude and correctly predict a good match with regards to luminosity confirms that simple additivity holds to at least a first order approximation.

Next, the interaction at the retina and brain between L, M, and S is considered. The matrices for converting XYZ->LMS such as those of Hunt imply the conversion from LMS->XYZ. Since it has been confirmed that LMS is the basis for color matching (i.e. LMS may be regarded as the "basis vectors" for color matching), this means that the LMS->XYZ conversion is by definition an LMS "mixing" or "cross-contaminating" transformation. Since performing such a conversion does not impact color matching, what precisely is the expected impact of this mixing on a human observer, if any? Phrased another way, is there any physical justification for the current LMS->XYZ mixing transforms?

There is indeed a common human experience that justifies to some extent the current mixing or contaminating of LMS into XYZ. It is emphasized again that X, Y, and Z truly represent the "bottom line" red, gray, blue sensation experienced by the human observer, which is denoted as RGB.

The evidence for the contamination and stimulation of the red observer function X by the blue part of the spectrum which can be easily seen in both the 2 and 10 degree observers is the existence of "violet" at the shortest wavelength end of the visible spectrum. If no contamination or stimulation were occurring in the red X human observer, the shortest wavelength end of the spectrum would simply get deeper and deeper blue until it lost visibility. As one embodiment of the invention it is contended that the red shift of blue towards violet of short wavelengths implies that some contamination of the red observer X is indeed occurring. Thus, this contamination (as seen above) has no impact on matching all colors that stimulate the LMS in a similar manner will match however, the contamination affects how these matching colors are perceived by the human eye+brain: colors in the region of short wavelength will appear violet, not merely a deeper blue.

A second manifestation of color mixing LMS->XYZ would be that to the extant the LMS functions are subtracted from each other, one will expect more acute color differentiation to occur, i.e. colors of different LMS values will appear significantly different visually. Likewise, to the extant LMS sensitivities are allowed to cross contaminate one another; one would expect reduced color sensitivity and color differentiation.

As a starting point, it may be assumed that L, M, and S map directly to X,Y and Z (i.e. their primary color identification is defined as red, gray, and blue). It is realized that this is a very crude starting point since it implies that all the luminance "gray" intensity Y is based entirely on the medium wavelength cone response $M(\lambda)$. However, if the method of LMS->XYZ optimization described below is robust, the valid quantities of LMS that combine to yield the sensation of luminosity Y will automatically and correctly be determined.

The interpretation of positive and negative values of the matrix that converts LMS->XYZ is considered. If negative coefficients are used to mix (for example) M (green cone sensitivity) with X (red color perceived), this implies a subtraction of the M sensitivity from the L sensitivity, resulting in more acute differentiation. On the other hand, if a positive coefficient is used to mix S (blue cone sensitivity) with X (red color perceived), then the distinction between red and blue is slightly blurred. Hence, any inter-channel mixing of LMS into XYZ in the way of positive coefficients may be regarded as contamination between the LMS sensitivities as they interact with each other in the eye+brain system. Inter-channel mixing of LMS into XYZ comprising of negative coefficients may be regarded as increased differentiation between the LMS sensitivities of the eye.

Thus, the expected outcome of this mixing of LMS->XYZ is an increase/decrease in color differentiation with negative/positive values of mixing of LMS->XYZ. Since it already has been shown that this mixing does not impact the matching of color spectra, we conclude that the manifestation of these positive/negative mixing coefficients are:

1) The human perception of hues, for example "red" mixing with blue at the violet end of the spectrum.
2) The impact on just noticeable differences (JND) and on magnitudes of large color differences, which have objective historical data in the form of MacAdam-type ellipses and color perception ordering systems such as Munsell.

It is the assumption of the present invention that there is great value in improving the existing conversion of LMS->XYZ and in the coefficients used to calculate simple color appearance models such as CIELAB in order to permit significant improvement to these models. Some of the results of these improvements are expected to be:

1) The magnitudes of red color perceived in areas of blue spectrum should be correct.
2) The consistency of the radii of MacAdam-type ellipses plotted in the modified CIELAB space should be improved.
3) Adjacent colors in color-order systems such as Munsell should have consistent differences of Euclidean distances in color space, i.e. pairs of colors that are supposed to be equally spaced perceptually should have similar ΔE's.

Method for Improved Determination of Post Cone Color Mixing of LMS with Corresponding Improvement to the XYZ Observer Functions.

It is predicted that the most obvious current deficiency in the correlation of JND Oust noticeable difference) quantified as ΔE in CIELAB and human visual experience can be used to estimate modifications to the mixture of LMS->XYZ that are currently defined. Similarly, the comparison of differences in color that are considered to be visually equal in magnitude (such as the increments of color defined in a color order system such as Munsell) can be used to optimize LMS->XYZ.

The conversion of LMS->XYZ is essentially a problem with six variables (i.e. the amount of mixing of two channels with each of the primary channels). The conversion matrix is constrained by the requirement that the values of XYZ are equal for an equal energy spectrum.

$$\begin{pmatrix} 1 \\ 1 \\ 1 \end{pmatrix} = M'_{LMS \to XYZ} \begin{pmatrix} 1 \\ 1 \\ 1 \end{pmatrix} \quad (5\text{-}1)$$

$$= \begin{pmatrix} m_{11} & m_{12} & m_{13} \\ m_{21} & m_{22} & m_{23} \\ m_{31} & m_{32} & m_{33} \end{pmatrix} \begin{pmatrix} 1 \\ 1 \\ 1 \end{pmatrix}$$

$$m_{11} = 1 - m_{12} - m_{13}$$
$$m_{22} = 1 - m_{21} - m_{23}$$
$$m_{33} = 1 - m_{31} - m_{32}$$

$$M'_{LMS \to XYZ} = \begin{pmatrix} 1 - m_{XM} - m_{XS} & m_{XM} & m_{XS} \\ m_{YL} & 1 - m_{YL} - m_{YS} & m_{YS} \\ m_{ZL} & m_{ZM} & 1 - m_{ZL} - m_{ZM} \end{pmatrix}$$

The subscripts i, j in the element $m_{i,j}$ indicate the mixing of L, M, and S into channels X, Y, and Z, i.e. "$m_{XM}$" indicates the mixing of medium sensitivity cone M into the X "red" sensation in the brain.

The improved determination of the amount of positive/negative inter-channel mixing can be accomplished by defining a variable function converting LMS->XYZ->CIELAB via an adjustable LMS->XYZ matrix. This adjustable version of CIELAB can be used to calculate the radii of the ellipses created from MacAdam-type data sets in the modified CIELAB space and the delta E differences adjacent colors defined in the M-unsell color ordering system as well as any other ordered color systems.

In order to calibrate the calculations for visual differences, it will be assumed that the simplest metric for the most simple range of colors is correct, i.e. L* for a series of white/gray/black colors. Since the matrix defined above is invariant with regards to white, the values of L* for neutral colors will not change with optimization of the matrix. Hence, the interpretation of "1 ΔE" with regards to magnitude of visual difference in color will be the magnitude of visual difference in white/gray/black. Differences of 1 ΔE for all other pairs of colors will be compared to this reference, i.e. is the visual difference between any particular pair of colors that differ by 1 ΔE more or less noticeable than that of white/gray/black. Similar comparisons can be made between pairs of colors differing by 5 or 10 ΔE.

The error minimization to be performed will be in the form of minimizing the difference of the ΔE differences between multiple pairs of colors determined to have a similar magnitude of JND. For example, several pairs of colors can be extracted from the MacAdam ellipses. Each pair would comprise of the centroid of one MacAdam ellipse paired with one color on the surface of the ellipse. Let i,j denote ellipse i (from the set of $N_{ME}$ MacAdam ellipses) with tristimulous value $XYZ_{i0}$ at the center of the ellipse and color sample j (from the set of $N_s$ samples on the ellipse surface) with tristimulous value $XYZ_{ij}$. The first summation of squared errors to be minimized will be the differences between the values of $\Delta E_{ij}$ for each pair of colors denoted by ij and the average value $\Delta E_{ave}$ for all the pairs:

$$\Delta E_{ij}(M'_{LMS \to XYZ}) = |\vec{Lab}_{ij} - \vec{Lab}_{i0}| \quad \text{Eq. (5-2)}$$

where $$\vec{Lab}_{ij} = \vec{Lab}(M'_{LMS \to XYZ} M^{-1}_{LMS \to XYZ} \vec{XYZ}_{ij})$$

$$\vec{Lab}_{i0} = \vec{Lab}(M'_{LMS \to XYZ} M^{-1}_{LMS \to XYZ} \vec{XYZ}_{i0})$$

$$SumSquErr_{JND}(M'_{LMS \to XYZ}) =$$

$$\sum_{i=1,j=1}^{i=N_{ME}, j=N_S} [\Delta E_{ij}(M'_{LMS \to XYZ}) - \Delta E_{ave}(M'_{LMS \to XYZ})]^2 \Delta$$

$$E_{ave}(M'_{LMS \to XYZ}) = \frac{1}{N_{ME}N_S} \sum_{i=1,j=1}^{i=N_{ME}, j=N_S} \Delta E_{ij}(M'_{LMS \to XYZ})$$

If perfectly optimized, all the values of $\Delta E_{ij}$ would be the same, all $\Delta E_{ij} = \Delta E_{ave}$, and the summation SumSquErr$_{JND}$ (M'$_{LMS->XYZ}$) would be zero. In reality, due to the noise and uncertainty in the data acquired by MacAdam, this error function will be minimized, but not necessarily to 0. The next summation will be for a color-order system (COS) such as Munsell. Based on descriptions of the intent of the Munsell system, the following assumptions may be made for purposes of optimizing the LMS->XYZ matrix in order to create a perceptually uniform space:

1) Pairs of colors having Munsel value i and i+1 should have the same change in L* as the corresponding pair of Munsell gray colors of values i and i+1;
2) Pairs of color having the same Munsel hue k and value i, and chromas j and j+1 should all have the same value of ΔC*; and
3) Pairs of color having the same value i, and chroma j, with hues k and k+1, should differ by the same value of $\Delta E_{hue} = (\Delta E^2 - \Delta L^{*2} - \Delta C^{*2})^{1/2}$.

First ΔE, ΔL*, ΔC*, ΔH* are defined between pairs of colors using the increments Δi, Δj, Δk for the values of value, chroma, and hue:

$$\Delta E_{ijk}(M'_{LMS\to XYZ}, \Delta i, \Delta j, \Delta k) = |\overrightarrow{Lab}(\overrightarrow{XYZ'}_{i+\Delta i, j+\Delta j, k+\Delta k}) - \overrightarrow{Lab}(\overrightarrow{XYZ'}_{ijk})| \quad \text{Eq. (5-3)}$$

$$\Delta L^*_{ijk}(M'_{LMS\to XYZ}) = L^*(\overrightarrow{XYZ'}_{i+1,j,k}) - L^*(\overrightarrow{XYZ'}_{i,j,k})$$

$$\Delta C^*_{ijk}(M'_{LMS\to XYZ}) = C^*(\overrightarrow{XYZ'}_{i,j+1,k}) - C^*(\overrightarrow{XYZ'}_{i,j,k})$$

$$[\Delta H^*_{ijk}(M'_{LMS\to XYZ})]^2 = [\Delta E_{ijk}(M'_{LMS\to XYZ}, 0,0,1)]^2 - [L^*(\overrightarrow{XYZ'}_{i,j,k+1}) - L^*(\overrightarrow{XYZ'}_{i,j,k})]^2 - [C^*(\overrightarrow{XYZ'}_{i,j,k+1}) - C^*(\overrightarrow{XYZ'}_{i,j,k})]^2$$

where $$\overrightarrow{XYZ'} = M'_{LMS\to XYZ} M^{-1}_{LMS\to XYZ} \overrightarrow{XYZ} \quad \text{Eq. (5-4)}$$

Next the sum squared error of the differences of the ΔE differences from the average ΔE within a series of colors that are determined to be equally spaced perceptually are determined. The sums are separated according to colors equally spaced in value (ΔL*), chroma (ΔC*), and hue (ΔE$_{hue}$):

$$SumSquErr_{L^*}(M'_{LMS\to XYZ}) = \sum_{i=1, j=1, k=1}^{i=N_{Value}, j=N_{Chroma}, k=N_{Hue}} [\Delta L^*_{ijk}(M'_{LMS\to XYZ}) - \overline{\Delta L^*_{jk}}(M'_{LMS\to XYZ})]^2 \quad \text{Eq. (5-5)}$$

$$\overline{\Delta L^*_{jk}}(M'_{LMS\to XYZ}) = \frac{1}{N_{Value}} \sum_{i=1}^{i=N_{Value}} \Delta L^*_{ijk}(M'_{LMS\to XYZ})$$

$$SumSquErr_{C^*}(M'_{LMS\to XYZ}) = \sum_{i=1, j=1, k=1}^{i=N_{Value}, j=N_{Chroma}, k=N_{Hue}} [\Delta C^*_{ijk}(M'_{LMS\to XYZ}) - \overline{\Delta C^*_{ik}}(M'_{LMS\to XYZ})]^2 \quad \text{Eq. (5-6)}$$

$$\overline{\Delta C^*_{ikChroma}}(M'_{LMS\to XYZ}) = \frac{1}{N_{Chroma}} \sum_{j=1}^{j=N_{Value}} \Delta C^*_{ijk}(M'_{LMS\to XYZ})$$

$$SumSquErr_{H^*}(M'_{LMS\to XYZ}) = \sum_{i=1, j=1, k=1}^{i=N_{Value}, j=N_{Chroma}, k=N_{Hue}} [\Delta H^*_{ijk}(M'_{LMS\to XYZ}) - \overline{\Delta H^*_{ij}}(M'_{LMS\to XYZ})]^2 \quad \text{Eq. (5-7)}$$

$$\overline{\Delta H^*_{ij}}(M'_{LMS\to XYZ}) = \frac{1}{N_{Hue}} \sum_{k=1}^{k=N_{Hue}} \Delta H^*_{ijk}(M'_{LMS\to XYZ})$$

$$SumSquErr_{C^*}(M'_{LMS\to XYZ}) = \sum_{i=1, j=1, k=1}^{i=N_{Value}, j=N_{Chroma}, k=N_{Hue}} [\Delta C^*_{ijk}(M'_{LMS\to XYZ}) - \overline{\Delta C^*_{ik}}(M'_{LMS\to XYZ})]^2$$

$$\overline{\Delta C^*_{ikChroma}}(M'_{LMS\to XYZ}) = \frac{1}{N_{Chroma}} \sum_{j=1}^{j=N_{Value}} \Delta C^*_{ijk}(M'_{LMS\to XYZ})$$

It is noted that the values of $N_{Value}$, $N_{Chroma}$, and $N_{Hue}$ are actually not fixed throughout color-order systems such as Munsell, but rather vary as a function of i, j, and k. For example, the value of $N_{value}$ is 10 for a gray scale, (Chroma=0), but may be 1 or 2 for saturated regions of color space, i.e. colors with large value of chroma. Thus the values of $N_{Value}$ should be dynamically calculated or determined for a particular set of values for Chroma and Hue (j and k). It is assumed for simplicity of documentation that the above summations implicitly contain values of $N_{Value}$, $N_{Chroma}$, and $N_{Hue}$ that depend on i and/or j and/or k.

The above are combined into one summation that captures the total discrepancy or error in perceptual uniformity between CIELAB and a color-order system such as Munsell. This is the error function to be minimized via optimization of the LMS->XYZ matrix:

$$SumSquErr_{COS}(M'_{LMS\to XYZ}) = SumSquErr_{L^*}(M'_{LMS\to XYZ}) + SumSquErr_{C^*}(M'_{LMS\to XYZ}) + SumSquErr_{H^*}(M'_{LMS\to XYZ}) \quad \text{Eq. (5-8)}$$

The two summations, JND and COS can be combined into a total error to be minimized:

$$SumSquErr_{Total}(M'_{LMS\to XYZ}) = SumSquErr_{JND}(M'_{LMS\to XYZ}) + SumSquErr_{COS}(M'_{LMS\to XYZ}) \quad \text{Eq. (5-9)}$$

This ensures that the resulting optimized matrix yields the closest agreement possible with these two very different historical characterizations of perceptual uniformity—MacAdam ellipses (or similar JND data) and color-order systems such as Munsell.

The coefficients contained in $M'_{LMS\to XYZ}$ can be shown to have a large impact on the symmetry and shapes of contour plots of constant Munsell chroma at constant value (i.e. L*). The diameters of the contours in the a* and b* directions are defined by the coefficients contained in the expressions for a* and b* in CIELAB.

Since the above optimizations of LMS->XYZ will be affected by the coefficients that currently exist in the equations for scaling L*a*b*, the coefficients for a* and b* will be added to the optimization process.

A least squares fit (LSF) was performed on the Munsell data set acquired from RIT entitled "real.dat". This data was apparently measured with near-D65 illumination. All measured values of Yxy provided by RIT, as well as the near-D65

Yxy value of illumination were converted to XYZ and from XYZ to LMS via the Hunt-Pointer-Estevez matrix from section 6 of this report. These values of LMS were converted to EdgeXYZ by means of an adjustable LMS->XYZ matrix as indicated in Equation 1-12 above. Next, the values of EdgeXYZ were converted to EdgeLAB using the recalculated value of EdgeXYZ white reference for the near-D65 illumination, and using adjustable values of the coefficients for a* and for b*.

In the fit, the values of $m_{ij}$ were automatically adjusted as well as the scaling coefficients used to calculate a* and b* (currently 500 and 200 respectively in the CIELAB equations). The error minimization was performed using Powell's method in one embodiment, using the average change in chroma of CIELAB between increments of Munsell chroma for calculating the standard deviation in chroma increments for EdgeLAB. This latter choice was made to ensure that EdgeLAB would be as consistent as possible with historical metrics, and to avoid reducing the standard deviation of the chroma increments by accidentally reducing the overall chroma itself for all colors.

The quality metric for assessment was to calculate the standard deviation for equal steps of L* (value), equal steps of hue, and equal steps of chroma. The following parameters resulted from this error minimization:

TABLE 12

Calculated Parameters for EdgeXYZ

| LMStoXYZMatrix | LMS_L | LMS_M | LMS_S |
| --- | --- | --- | --- |
| XYZ_X = | 1.83489 | −1.0069 | 0.17201 |
| XYZ_Y = | 0.282207 | 0.733972 | −0.0161793 |
| XYZ_Z = | −0.0508106 | 0.162992 | 0.887818 |
| a * Coefficient = | 524.90 | | |
| b * Coefficient = | 220.12 | | |
| mSigmaEdgeL = | 0.29 | | |
| mSigmaEdgeC = | 1.08 | | |
| mSigmaEdgeH = | 1.28 | | |
| mSigmaCIE_L = | 0.25 | | |
| mSigmaCIE_C = | 1.54 | | |
| mSigmaCIE_H = | 1.34 | | |

As can be seen, the above modified values of the LMS->XYZ matrix and corresponding coefficients for a*b* in CIELAB result in a 33% improvement in the consistency of the calculated deltaE in the direction of chroma as defined in the Munsell Color Order System. One notes that the biggest impact of optimizing the LMS->XYZ matrix is on the symmetry of contour plots of equal chroma at different fixed levels of value. The lop-sided contours in the direction of yellow for CIELAB appear to imply contamination of the blue response of the eye+brain, $Z(\lambda)$.

A test was performed to confirm the validity of the Munsell color order system. Although the optimization process resulted in changes to CIELAB, the changes were not dramatic since CIELAB had already been optimized to agree well with Munsell. If the assumptions regarding how Munsell colors should be interpreted were incorrect, the entire basis upon which CIELAB was optimized could be false.

In the test, two charts were created. In the first chart, steps of color were created that differed from their surround by 10, 20, and 30 delta E units in the direction of chroma for each of the major 6 directions of color (Y, R, M, B, C, G) for three levels of L*—60, 50, and 40. In the second chart, steps of color were created that differed from their surround by 10, 20, and 30 delta E units in the direction of reduced chroma, direction of reduced L*, and in a counterclockwise direction of hue for a single value L*=70 for the surround, again replicated for each of the 6 major directions of color.

It was clear that both CIEXYZ and CIELAB as well as EdgeXYZ and EdgeLAB as defined using the Munsell data were inaccurate by a significant amount, implying that either Munsell was flawed or the interpretation for Munsell was flawed that was used to optimize CIELAB. The magnitude of visual difference for changes in yellow chroma compared to the chromas of other colors appeared to be inaccurate by a factor of 1.5. Likewise, the magnitude of visual difference for changes in L* for all the colors appeared to be larger by a factor of 4 than comparable changes in chroma and hue.

It was also observed that in many colors, as chroma increased at fixed L*, the visual luminosity increased by approximately 3 delta E units in L* for a 30 delta E change in chroma. This phenomenon has been observed for many years and is called the Helmholtz-Kohlrausch Effect (see section 6-5 of Fairchild's *Color Appearance Models*, Chapter 9, pp. 199-221). Typically, empirical corrections were derived that added complexity to color appearance models.

However, with the interpretation described above for the relationship of LMS->XYZ, such a phenomenon has a simple explanation. If it appears that for example steps of red increase in perceived L* as chroma increases, this clearly implies that the quantity of long wavelength cone response $L(\lambda)$ mixed in to define luminosity Y (i.e. the value of $m_{YL}$ in the LMS->XYZ matrix) is too small. Increasing this value will result in larger values of Y as the magnitude of cone response $L(\lambda)$ increases relative to cone response $M(\lambda)$.

Since the Munsell-based optimization of EdgeXYZ and EdgeLAB did not result in a satisfactory test, the two charts described above were adjusted manually in order to ensure that the differences in all directions of color resulted in a similar magnitude of visual difference. This data was then used to improve LMS->XYZ matrix and the a*b* coefficients through manual adjustment of the parameters. It was found that it was relatively easy to determine improved values that agreed with the values in the modified charts to within the uncertainty of the visual adjustments performed in order to optimize the appearance of the charts (i.e. less than +/−5 deltaE in units of CIELAB). The qualitative modifications to both the LMS->XYZ matrix as well as to the a* and b* coefficients was quite significant, as indicated below in Table 13:

TABLE 13

| | L | M | S |
| --- | --- | --- | --- |
| X | 1.9202 | −1.1121 | 0.1919 |
| Y | 0.6210 | 0.3390 | 0.0400 |
| Z | 0.3500 | 0.1500 | 0.5000 |
| EdgeCoeff_a | 130.00 | | |
| EdgeCoeff_b | 80.00 | | |

Qualitatively, the big differences from the Munsell-based optimization are:
1) Significant contamination of blue channel Z with "red" and "green" cone response (L and M)
2) Significant increase in red impact on luminosity or gray sensation "Y"
3) Reduction of coefficients for "a*" and "b*" by a factor of 3
4) Reduction of the ratio of coefficients for a* and b* from 5/2 (=2.5) to 13/8 (=1.625)

Based on the above, a new color order system can be defined with similar concepts of lightness (value), hue, and chroma as Munsell. This new color order system can be laid out in units of 10 deltaE for L* and C*. The identification of hues would be similar to Munsell.

It appears that significant improvements can be made both to color matching and color perception. The former improvement entails refining the definition of the LMS cone sensitivity functions, the latter entails optimizing the conversion of LMS->XYZ and the coefficients for a* and b* in order to correlate well with color perception, both JND and color-order systems. Using validation tests to confirm perceptual consistency, color order systems themselves can be confirmed or significantly improved by using the results of the tests to generate significantly better versions of EdgeXYZ and EdgeLAB.

The above described method for improvement to the LMS cone responses will have some of the following impact in some embodiments of the invention:
1) Reconcile the 25 ΔE discrepancy in the matching of whites with significantly different spectra;
2) Reconcile errors in matching saturated colors;
3) Should enable excellent visual matches between images on any display and corresponding hard copy images under an illuminant, or backlit transparencies;
4) Enable accurate matches between sources of illumination such as standard fluorescent tubes even when spectra are different;
5) Enable good visual match between images digitally projected with either projected film images or original colors in a scene; and
6) Allow accurate color between flat panel displays, HDTV, etc. between display venders and between displays and other forms of color imaging such as printed advertisements and packaging.

The above described method for improvement to LMS->XYZ and the coefficients of a* and b* in EdgeLAB will have a large impact on:
1) Quality of color reproduction when mapping from large gamut to smaller gamut systems due to having a more uniform perceptual color space;
2) Optimizing the appearance of saturated spot colors printed on devices with moderate color gamut such as ink jet; and
3) Quantifying the magnitude of ΔE errors for specifying inks, display colorants, and proofing systems.

Figure 12:
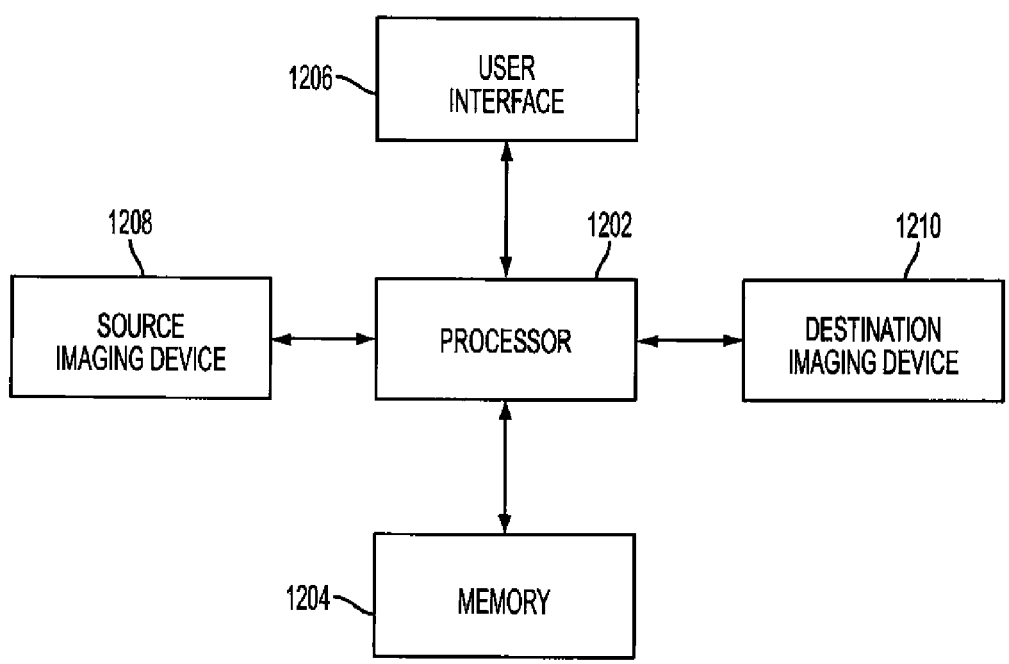
FIG. 12 shows a block diagram of a system in accordance with an embodiment of the invention.

Referring now to FIG. 12, there is shown a block diagram illustrating an exemplary operating environment for application of the technique(s) previously discussed above in accordance with an embodiment of the invention. In particular, FIG. 12 shows a general purpose-computing environment or system 1200 comprising a processor 1202, memory 1204, user interface 1206, source-imaging device 1208 and destination-imaging device 1210.

Source imaging device 1208 and destination imaging device 1210 may be display devices or printers in one embodiment. Source imaging device can act as an input for spectral information into processor 1202. Source-imaging device 2108 may be an image capture device such as a scanner or camera. In either case, source imaging device 1208 and destination imaging device 1210 operate according to an applicable set of device-dependent coordinates. As an example, source-imaging device 1208 may be an image capture device that produces source device data defined by RGB coordinates, while destination-imaging device 1210 may be a printer that produces destination device data. Memory 1204 can include both volatile (e.g., RAM) and nonvolatile (e.g., ROM) storage and can store all of the previously discussed characterization and correction techniques.

User interface 1206 may include a display device, such as a cathode ray tube (CRT), liquid crystal display (LCD), plasma display, digital light processing (DLP) display, or the like, for presentation of output to a user. In addition, user interface 1206 may include a keyboard and pointing device, such as a mouse, trackball or the like to support a graphical user interface. In operation, a user interacts with processor 1202 via user interface 1206 to direct conversion of source device data to destination device data. Memory 1204 stores process-readable instructions and data for execution by processor 1202. The instructions include program code that implement the chromatic adaptation techniques described herein. Processor 1202 may operate in any of a variety of operating systems, such as Windows™, Mac OS, Linux, Unix, etc.

Processor 1202 may take the form of one or more general-purpose microprocessors or microcontrollers, e.g., within a PC or MAC computer or workstation. In an alternative embodiment, the processor 1202 may be implemented using one or more digital signal processors (DSPs), application specific integrated circuits (ASICs), field programmable logic arrays (FPGAs), or any equivalent integrated or discrete logic circuitry, or any combination thereof. Memory 2104 may include or utilize magnetic or optical tape or disks, solid state volatile or non-volatile memory, including random access memory (RAM), read only memory (ROM), electronically programmable memory (EPROM or EEPROM), or flash memory, as well as other volatile or non-volatile memory or data storage media. Processor 1202 can execute the techniques disclosed herein for color measurement and other methods using programs stored within system 1200 or outside of system 1200 (i.e., stored in an external database, etc.).

Figure 13:
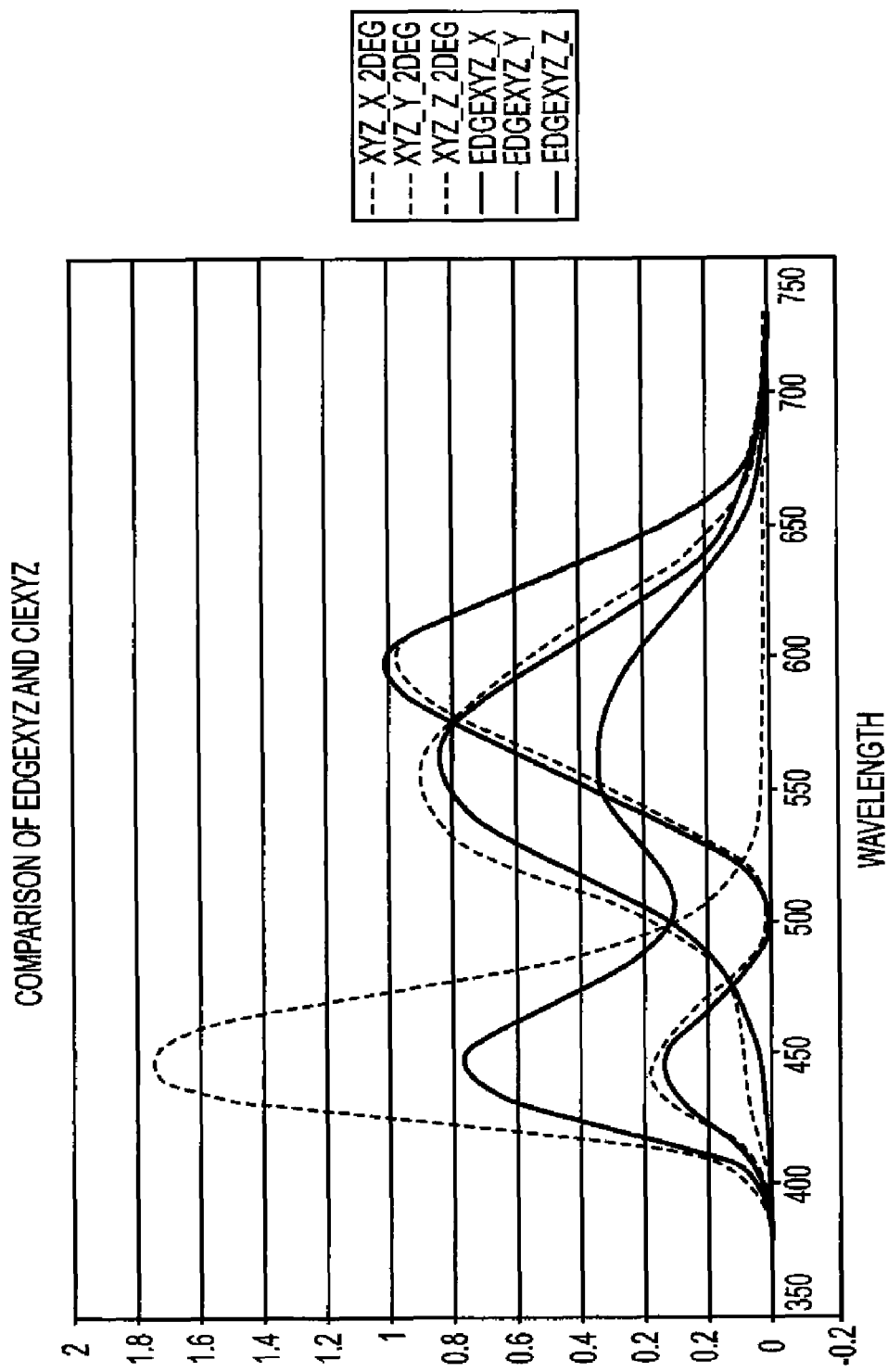
FIG. 13 shows a graph highlighting a comparison of the current invention XYZ versus CIELAB XYZ in accordance with an embodiment of the invention.
Figure 14:
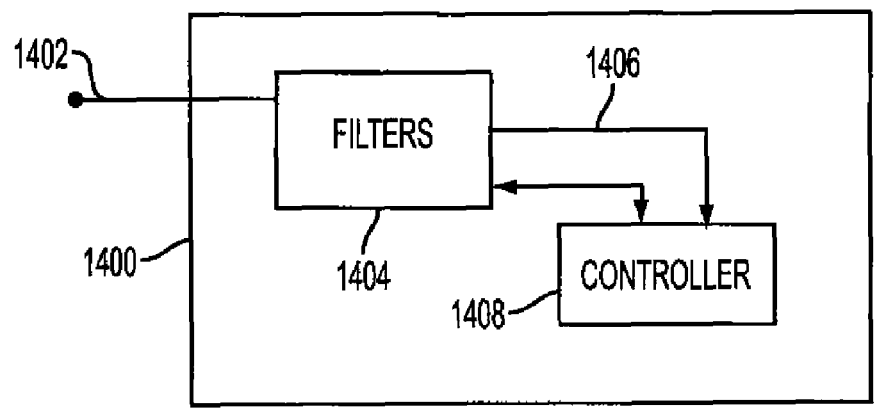
FIG. 14 shows a device in accordance with an embodiment of the invention.

FIG. 13 shows a graph highlighting a comparison of the current invention XYZ versus CIELAB XYZ in accordance with an embodiment of the invention. FIG. 14 highlights a device such as a digital camera or colorimeter 1400 that includes an input 1402 for receiving a color stimulant; one or more filters 1404 optimized for filtering the color stimulant for determining EdgeLMS and EdgeXYZ from the color stimulant without requiring a full spectral measurement, the filtering. Filters 1404 are preferably executed using controller 1408. The filters 1404 are preferably software filters that determine EdgeLMS and EdgeXYZ and provided at output 1406 as described herein. This provides for a very efficient way of determining the required measurement without having to resort to a full spectral measurement which is time consuming.

Figure 15:
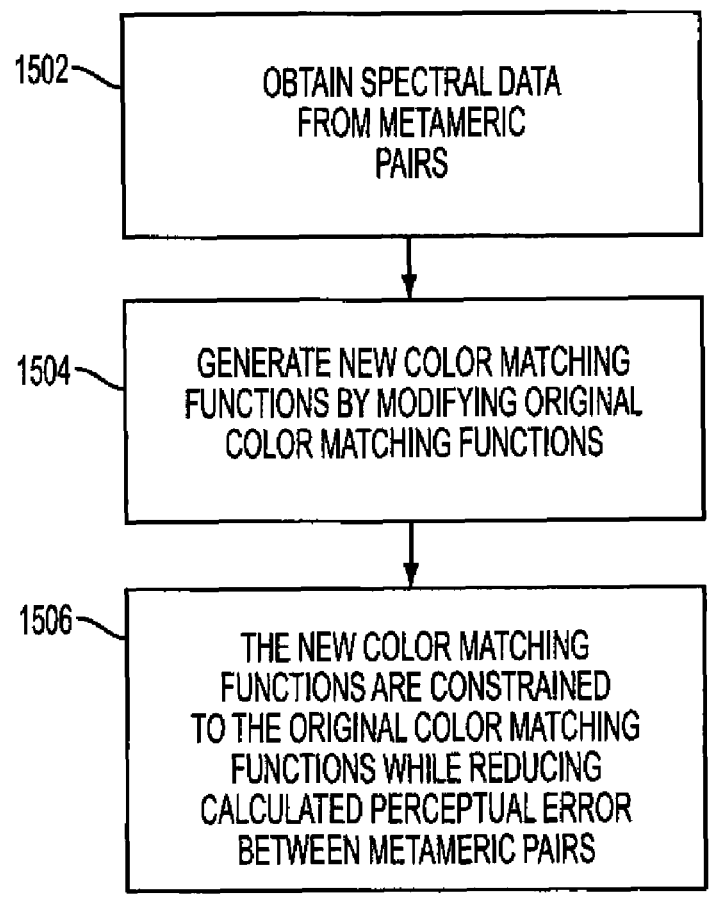
FIG. 15 shows a flow chart for a technique for determining color matching functions in accordance with an embodiment of the invention.

In FIG. 15, there is shown a flowchart highlighting a method for determining color matching functions in accordance with an embodiment of the invention. In 1502, spectral data from metameric pairs is obtained. In 1504, new color matching functions are generated by modifying original color matching functions. While in 1506, the new color matching functions are constrained to the original color matching functions while reducing calculated perceptual error between the metameric pairs. In one embodiment of the invention, calculated perceptual error is reduced by at least 50 percent.

Figure 16:
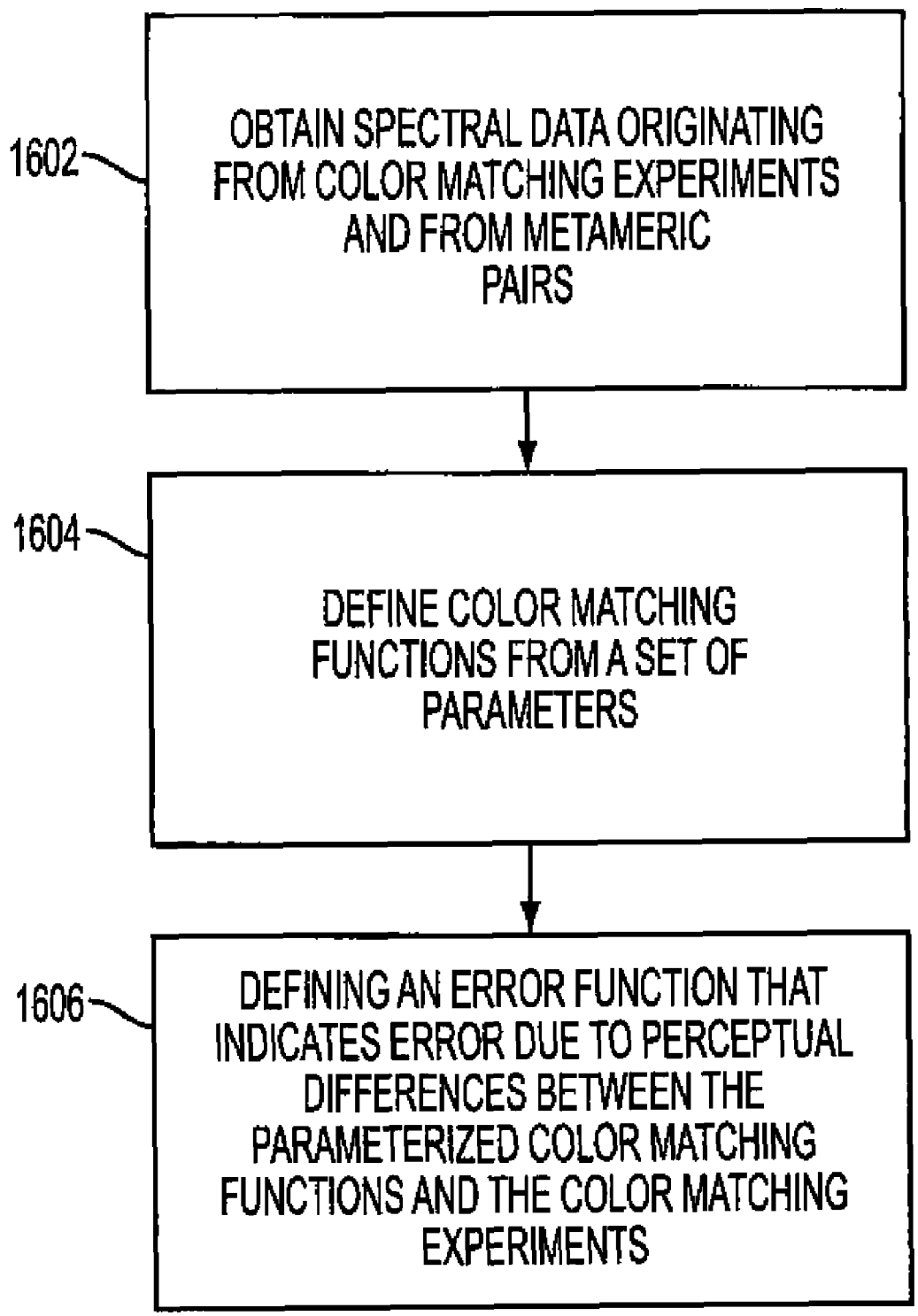
FIG. 16 shows a flow chart for a technique for determining color matching functions in accordance with another embodiment of the invention.

In FIG. 16, a flowchart highlighting a method for determining color matching functions in accordance with an embodiment of the invention is highlighted. In 1602, spectral data originating from color matching experiments and from metameric pairs is obtained. Color matching functions from a set of parameters is defined in 1604. In 1606, an error function that indicates error due to perceptual differences between the parameterized color matching functions and the color matching experiments is defined. In one embodiment the number of parameters in the set of parameters is set to less than 96.

Some further embodiments of the invention will be now described. These embodiments are not intended to be limited but are described in order to provide a better understanding of some of the uses and different applications for the invention. In one embodiment, a method for optimizing the EdgeLMS cone response functions, the conversion of EdgeLMS->EdgeXYZ, and the calculation of EdgeLAB from EdgeXYZ is accomplished. The method entails optimizing parameters in order to achieve good agreement between the metrics used to define color and a variety of experimental data based on human observers. The optimization can be performed manually via trial and error or can be performed automatically via least squares fit or other well known techniques. Another embodiment of the invention comprises an apparatus that accepts a variety of experimental data based on human observers and automatically generates the optimal modifications to EdgeLMS, EdgeXYZ, and EdgeLAB in the manner described above.

Another embodiment of the invention comprises an apparatus that contains the improved characterizations of EdgeLMS, EdgeXYZ, and/or EdgeLAB that have already been determined via the method or apparatus above. The input to this apparatus includes spectral measurement data, with the optional spectral measurement of a white reference and/or white illuminant. The output of the apparatus is the calculated EdgeLMS and/or EdgeXYZ. If spectral white reference data is included, the apparatus can also output values of EdgeLAB. The value of this apparatus is that any two colors that have the same EdgeXYZ and/or EdgeLAB will be a good visual match to one another even if their measured spectra are significantly different. Note that the apparatus may be contained within the measurement device itself without the need for an external computer to provide a convenient way to measure and display the values of EdgeLMS, EdgeXYZ, or EdgeLAB.

In still another embodiment of the invention, an apparatus that contains the previously determined definitions of EdgeLMS, EdgeXYZ, and EdgeLAB and that receives as input spectral data files corresponding to a variety of color measurements. The output of the apparatus includes an ICC profile, or equivalent thereof, based upon EdgeLMS, EdgeXYZ, and/or EdgeLAB. Alternatively, the apparatus may receive data files that already contain the calculated values of EdgeLMS, EdgeXYZ, and/or EdgeLAB for purposes of creating an ICC profile or the equivalent thereof. Such an apparatus would optionally have a means of identifying that the ICC profile thus generated is based upon the Edge color standard vs. the CIE standard as currently defined in the CIE 2 or 10 degree observers.

Another embodiment of the invention comprises an apparatus that receives as input CIE color data and/or ICC profiles based on CIE color data. The apparatus performs all color mapping from source to destination devices, particularly for out of gamut colors, by converting CIELAB->EdgeLAB and EdgeLAB->CIELAB for the source and destination profiles in order to obtain optimal gamut mapping. If the input is spectral data, then EdgeLMS can likewise be calculated as well for optimal color matching. The output of such an apparatus is either a device link for converting image data from a source device to a destination device or the converted image itself if one of the inputs is image data to be converted from source to destination device.

Another embodiment of the invention is an apparatus that captures digital color images, prints digital color images, displays digital color images, or otherwise processes digital color images. The apparatus contains color characterization information for the device either in the form of an ICC profile or equivalent thereof, or in the form of essential colorimetric data such as RGB chromaticities and white point in the example of an RGB display. The apparatus contains the characterization information utilizing the previously optimized EdgeLMS, EdgeXYZ, and/or EdgeLAB. The output of the device is either digital color data or a color image that is ensured to be visually accurate by utilizing the characterization information for the device based upon an apparatus that receives as input requests for defining either a source or destination device or both based upon a previously determined standard such as SWOP_C3 (defined by IDEALliance, international digital enterprise alliance) or AdobeRGB (defined by Adobe, Inc.) or any other applicable standard wherein the apparatus utilizes the Edge color standard to define the standard device characterization and to perform conversions of image color data.

The invention has been described in detail with particular reference to certain preferred embodiments thereof, but it will be understood that variations and modifications can be effected within the scope of the invention.

The invention claimed is:

1. A system, comprising:
   an input for receiving measured spectral data for at least one color; and
   a controller coupled to the input for calculating XYZ human observer defining parameters and parametric equations that are substantially similar to current definitions for LMS cone response functions based on CIE XYZ observer functions and converting the parameters and parametric equations to XYZ human observer functions, adjusting the parameters to maintain a similarity to the current definitions for the LMS cone response functions, and adjusting the parameters and parametric equations to maintain substantial similarity to the XYZ human observer functions while reducing calculated delta E ($\Delta$E) errors between matching pairs of metameric functions.

2. A system as defined in claim 1, wherein the input receives spectral data defining a reference white, and the controller calculates XYZ human observer functions for the reference white and calculates CIELAB color space values using the values of XYZ for the at least one color and XYZ for the reference white.

3. A system, comprising:
   means for receiving measured spectral data associated with a list of device code values;
   means for converting the spectral data to XYZ or LAB data by:
   (a) defining parameters and parametric equations that are substantially similar to current definitions for LMS cone response functions based on CIE XYZ observer functions;
   (b) converting the parameters and parametric equations to XYZ human observer functions;
   (c) substituting values in the CIE XYZ observer functions for CIELAB with values of XYZ human observer functions from (b); and
   means for generating an ICC profile using the XYZ or LAB data.

4. A system as defined in claim 3, wherein the ICC profile that is generated is tagged in order to indicate the XYZ or LAB metric used to generate the profile.

\* \* \* \* \*